(12) United States Patent
Nagaoka et al.

(10) Patent No.: US 11,515,730 B2
(45) Date of Patent: *Nov. 29, 2022

(54) CONTACTLESS POWER TRANSMISSION SYSTEM FOR TRANSMITTING POWER FROM POWER TRANSMITTER APPARATUS TO POWER RECEIVER APPARATUS, AND SUPPLYING LOAD DEVICE WITH DESIRED VOLTAGE

(71) Applicant: OMRON Corporation, Kyoto (JP)

(72) Inventors: Shingo Nagaoka, Kizugawa (JP); Taichi Mishima, Kizugawa (JP); Takeshi Uematsu, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/275,393

(22) PCT Filed: Nov. 28, 2019

(86) PCT No.: PCT/JP2019/046552
§ 371 (c)(1),
(2) Date: Mar. 11, 2021

(87) PCT Pub. No.: WO2020/144963
PCT Pub. Date: Jul. 16, 2020

(65) Prior Publication Data
US 2022/0052554 A1 Feb. 17, 2022

(30) Foreign Application Priority Data
Jan. 11, 2019 (JP) ............................. JP2019-003687

(51) Int. Cl.
*H02J 50/12* (2016.01)
*H02J 50/80* (2016.01)
(Continued)

(52) U.S. Cl.
CPC ............ *H02J 50/12* (2016.02); *B60L 53/122* (2019.02); *H02J 50/40* (2016.02); *H02J 50/60* (2016.02);
(Continued)

(58) Field of Classification Search
CPC .. H02J 50/12; H02J 50/40; H02J 50/60; H02J 50/80; H02J 2310/48; B60L 53/122; H01F 27/24; H01F 38/14
See application file for complete search history.

(56) References Cited

U.S. PATENT DOCUMENTS 8,330,391 B2 * 12/2012 Wendt ................ H02M 3/3376
315/307
8,330,436 B2 * 12/2012 Oraw ..................... H02M 3/07
323/272

(Continued)

FOREIGN PATENT DOCUMENTS

JP 2016111873 A 6/2016
JP 6201388 B2 9/2017
(Continued)

OTHER PUBLICATIONS

International Search Report for International Application No. PCT/JP2019/046552; dated Dec. 24, 2019.

(Continued)

*Primary Examiner* — Pinping Sun
(74) *Attorney, Agent, or Firm* — Cantor Colburn LLP

(57) ABSTRACT

A detection circuit detects at least one of a value of a current flowing through a power transmitting coil, and a value of a current or voltage generated by an auxiliary coil. A control circuit determines a transmitting frequency based on the value detected by the detection circuit, the transmitting frequency at least locally minimizing load dependence. The control circuit determines a voltage for the transmitting (Continued)

power at which an output voltage of a power receiver apparatus is equal to a predetermined target voltage when generating the transmitting power having the transmitting frequency determined, and controls the power supply circuit to generate the transmitting power having the transmitting frequency and voltage determined.

9 Claims, 11 Drawing Sheets

(51) Int. Cl.
*H02J 50/40* (2016.01)
*H02J 50/60* (2016.01)
*B60L 53/122* (2019.01)
*H01F 27/24* (2006.01)
*H01F 38/14* (2006.01)

(52) U.S. Cl.
CPC .............. *H02J 50/80* (2016.02); *H01F 27/24* (2013.01); *H01F 38/14* (2013.01); *H02J 2310/48* (2020.01)

(56) References Cited

U.S. PATENT DOCUMENTS

| | | | | |
|---|---|---|---|---|
| 2007/0018624 A1* | 1/2007 | Guo | .................... | H02M 3/1584 323/282 |
| 2009/0303749 A1* | 12/2009 | Boys | .................... | B60L 53/126 363/13 |
| 2011/0095619 A1* | 4/2011 | Urano | .................... | H02J 50/12 307/104 |
| 2011/0163729 A1* | 7/2011 | Issa | .......................... | H04B 5/02 363/126 |
| 2016/0254692 A1 | 9/2016 | Shcherbatko et al. | | |
| 2017/0141616 A1 | 5/2017 | Habraken et al. | | |
| 2018/0212477 A1* | 7/2018 | Misawa | .................. | H02J 50/90 |
| 2019/0020222 A1* | 1/2019 | Tsai | ........................ | H02J 50/12 |
| 2020/0099256 A1* | 3/2020 | Kanakasabai | ......... | B60L 53/126 |
| 2020/0280216 A1* | 9/2020 | Pei | .................... | H02J 7/007182 |
| 2020/0290467 A1 | 9/2020 | Gao et al. | | |
| 2020/0373785 A1* | 11/2020 | Bagchi | .................... | H02J 50/12 |
| 2020/0412172 A1* | 12/2020 | Nakao | .................... | H02J 50/12 |
| 2021/0162870 A1* | 6/2021 | Uhrig | .................. | H02M 3/1584 |

FOREIGN PATENT DOCUMENTS

| | | | | |
|---|---|---|---|---|
| JP | 2018121388 A | | 8/2018 | |
| KR | 101753013 B1 * | | 6/2017 | |
| WO | 2017165549 A1 | | 9/2017 | |
| WO | WO-2021024362 A1 * | | 2/2021 | .............. H02J 50/80 |

OTHER PUBLICATIONS

PCT Written Opinion of the International Searching Authority for International Application No. PCT/JP2019/046552; dated Dec. 24, 2019.

EPO Extended European Search Report for corresponding EP Application No. 19908841.0; dated Sep. 6, 2022.

* cited by examiner

FIG. 6

| COUPLING COEFFICIENT k12 | 0.1 | 0.2 | 0.3 | 0.4 | ... |
|---|---|---|---|---|---|
| CURRENT I1 OF POWER TRANSMITTING COIL L1 [A] | 0.75 | 0.98 | 1.19 | 1.25 | ... |
| CURRENT I3 OF AUXILIARY COIL L3 [A] | 0.24 | 0.61 | 0.83 | 0.97 | ... |

CONTACTLESS POWER TRANSMISSION SYSTEM FOR TRANSMITTING POWER FROM POWER TRANSMITTER APPARATUS TO POWER RECEIVER APPARATUS, AND SUPPLYING LOAD DEVICE WITH DESIRED VOLTAGE

CROSS REFERENCE TO RELATED APPLICATIONS

This is the U.S. national stage of application No. PCT/JP2019/046552, filed on Nov. 28, 2019. Priority under 35 U.S.C. § 119(a) and 35 U.S.C. § 365(b) is claimed from Japanese Application No. 2019-003687, filed Jan. 11, 2019, the disclosure of which is also incorporated herein by reference.

TECHNICAL FIELD

The present disclosure relates to a control apparatus for a power transmitter apparatus that transmits power to a power receiver apparatus in a contactless manner. The present disclosure further relates to a power transmitter apparatus provided with such a control apparatus, and relates to a contactless power transmission system including such a power transmitter apparatus.

BACKGROUND ART

Contactless power transmission systems are known, which transmit power from a power transmitter apparatus to a power receiver apparatus in a contactless manner. When the power transmitter apparatus transmits power to the power receiver apparatus in a contactless manner, the power receiver apparatus is not always placed at a fixed position relative to the power transmitter apparatus. Therefore, a distance between a power transmitting coil of the power transmitter apparatus and a power receiving coil of the power receiver apparatus may vary, and a coupling coefficient between the power transmitting coil and the power receiving coil may vary accordingly. When the coupling coefficient between the power transmitting coil and the power receiving coil varies, a voltage and/or current supplied from the power receiver apparatus to a load device varies accordingly.

In order for the power receiver apparatus to supply the load device with a desired voltage thereof, it may be possible to, for example, feed back an output voltage value and/or output current value of the power receiver apparatus to the power transmitter apparatus, and regulate a voltage applied to the power transmitting coil. In addition, in order for the power receiver apparatus to supply the load device with a desired voltage thereof, it may be possible to, for example, provide the power receiver apparatus with a DC/DC converter.

For example, Patent Document 1 discloses a non-contact power supply system that supplies a desired output voltage and output current to the battery by feeding back values of an output voltage value and an output current for a battery of a vehicle, from the vehicle to a power supply device, and regulating an output voltage and a drive frequency of the power supply device.

CITATION LIST

Patent Documents

PATENT DOCUMENT 1: Japanese patent No. JP 6201388 B1

SUMMARY OF INVENTION

Technical Problem

When the output voltage value and/or output current value of the power receiver apparatus is fed back to the power transmitter apparatus, some delay occurs, and it is difficult to follow rapid variations in a load value of the power receiver apparatus (a magnitude of a current flowing through the load device). In addition, when the power receiver apparatus is provided with a DC/DC converter, the size, weight, and cost of the power receiver apparatus increase. Therefore, it is required to control the power transmitter apparatus to supply the load device with a desired voltage thereof, without depending on the feedback from the power receiver apparatus to the power transmitter apparatus, and without providing the power receiver apparatus with extra circuits (DC/DC converter or the like).

Therefore, an object of the present disclosure is to provide a control apparatus for a power transmitter apparatus, the control apparatus being capable of controlling only the power transmitter apparatus based only on information that can be acquired by the power transmitter apparatus, to supply a load device with a desired voltage thereof.

Another object of the present disclosure is to provide a power transmitter apparatus having such a control apparatus, and to further provide a contactless power transmission system including such a power transmitter apparatus.

Solution to Problem

The control apparatus for the power transmitter apparatus, the power transmitter apparatus, and the contactless power transmission system according to aspects of the present disclosure are configured as described below to solve the above-described problems.

According to a control apparatus for a power transmitter apparatus of an aspect of the present disclosure, the control apparatus for a power transmitter apparatus transmits power to a power receiver apparatus provided with a power receiving coil, in a contactless manner. The power transmitter apparatus is provided with: a power transmitting coil, an auxiliary coil electromagnetically coupled to the power transmitting coil, and a power supply circuit that generates transmitting power having a variable voltage and a variable frequency and supplies the transmitting power to the power transmitting coil. The control apparatus is provided with a detection circuit and a control circuit. The detection circuit detects at least one of a value of a current flowing through the power transmitting coil, and a value of a current or voltage generated by the auxiliary coil. The control circuit determines a transmitting frequency based on the value detected by the detection circuit, the transmitting frequency at least locally minimizing dependence of an output voltage of the power receiver apparatus on a load value of the power receiver apparatus, determines a voltage for the transmitting power at which the output voltage of the power receiver apparatus is equal to a predetermined target voltage when generating the transmitting power having the transmitting frequency determined, and controls the power supply circuit to generate the transmitting power having the transmitting frequency and voltage determined.

Since the control apparatus for the power transmitter apparatus of the aspect of the present disclosure is configured as described above, it is possible to supply the load device with a desired voltage thereof, substantially without depending on the load value of the power receiver apparatus, by controlling only the power transmitter apparatus based only on the information that can be acquired by the power transmitter apparatus.

According to the control apparatus for the power transmitter apparatus of the aspect of the present disclosure, the power receiver apparatus is provided with a first load device having a variable load value, a second load device having a predetermined load value, and a switch circuit that selectively supplies the output voltage of the power receiver apparatus to one of the first load device and the second load device. The control apparatus is further provided with a communication device communicatively connected to the power receiver apparatus. When transmitting power in a normal manner, the control circuit transmits a signal to the power receiver apparatus using the communication device, the signal controlling the switch circuit to supply the output voltage of the power receiver apparatus to the first load device. When determining the transmitting frequency, the control circuit transmits a signal to the power receiver apparatus using the communication device, the signal controlling the switch circuit to supply the output voltage of the power receiver apparatus to the second load device, and determines the transmitting frequency based on the value detected by the detection circuit.

Since the control apparatus for the power transmitter apparatus of the aspect of the present disclosure is configured as described above, it is possible to correctly determine whether or not a foreign object exists between the power transmitting coil and the power receiving coil, even when the load device has a variable load value.

According to the control apparatus for the power transmitter apparatus of the aspect of the present disclosure, the control apparatus is further provided with a coupling coefficient estimator that estimates a coupling coefficient between the power transmitting coil and the power receiving coil based on the value detected by the detection circuit, and determines the transmitting frequency based on the coupling coefficient.

Since the control apparatus for the power transmitter apparatus of the aspect of the present disclosure is configured as described above, it is possible to supply the load device with a desired voltage thereof, substantially without depending on the load value of the power receiver apparatus, by controlling only the power transmitter apparatus based only on the information that can be acquired by the power transmitter apparatus.

According to the control apparatus for the power transmitter apparatus of the aspect of the present disclosure, the detection circuit is provided with a first detector that detects the value of the current or voltage generated by the auxiliary coil, and a second detector that detects the current flowing through the power transmitting coil. The coupling coefficient estimator estimates a first coupling coefficient between the power transmitting coil and the power receiving coil based on the value of the current or voltage generated by the auxiliary coil, and estimates a second coupling coefficient between the power transmitting coil and the power receiving coil based on the value of the current flowing through the power transmitting coil. When a difference between the first and second coupling coefficients is equal to or less than a predetermined threshold, the control circuit controls the power supply circuit to generate the transmitting power having the frequency and voltage determined.

Since the control apparatus for the power transmitter apparatus of the aspect of the present disclosure is configured as described above, it is possible to correctly and surely determine whether or not a foreign object exists between the power transmitting coil and the power receiving coil, and continue power transmission when no foreign object exists.

According to the control apparatus for the power transmitter apparatus of the aspect of the present disclosure, when the difference between the first and second coupling coefficients is greater than the predetermined threshold, the control circuit controls the power supply circuit to stop power transmission to the power receiver apparatus.

Since the control apparatus for the power transmitter apparatus of the aspect of the present disclosure is configured as described above, it is possible to correctly and surely determine whether or not a foreign object exists between the power transmitting coil and the power receiving coil, According to a power transmitter apparatus of an aspect of the present disclosure, the power transmitter apparatus is provided with: a power transmitting coil; an auxiliary coil electromagnetically coupled to the power transmitting coil; a power supply circuit that generates transmitting power having a variable voltage and a variable frequency and supplies the transmitting power to the power transmitting coil; and the control apparatus for the power transmitter apparatus.

Since the power transmitter apparatus of the aspect of the present disclosure is configured as described above, it is possible to supply the load device with a desired voltage thereof, substantially without depending on the load value of the power receiver apparatus, by controlling only the power transmitter apparatus based only on the information that can be acquired by the power transmitter apparatus.

According to the power transmitter apparatus of the aspect of the present disclosure, the power transmitter apparatus is further provided with a capacitor connected to the power transmitting coil so as to form an LC resonant circuit.

Since the power transmitter apparatus of the aspect of the present disclosure is configured as described above, it is possible to adjust a gain in output voltage of the power receiver apparatus, and improve efficiency of power transmission.

According to the power transmitter apparatus of the aspect of the present disclosure, the power transmitter apparatus is further provided with a magnetic core around which the power transmitting coil and the auxiliary coil are wound. The auxiliary coil is disposed so as to surround the power transmitting coil.

Since the power transmitter apparatus of the aspect of the present disclosure is configured as described above, it is possible to increase magnetic flux density of the power transmitting coil, and reduce leakage magnetic flux.

According to a contactless power transmission system of an aspect of the present disclosure, the contactless power transmission system includes: the power transmitter apparatus; and a power receiver apparatus provided with a power receiving coil.

Since the contactless power transmission system of the aspect of the present disclosure is configured as described above, it is possible to supply the load device with a desired voltage thereof, substantially without depending on the load value of the power receiver apparatus, by controlling only the power transmitter apparatus based only on the information that can be acquired by the power transmitter apparatus.

Advantageous Effects of Invention

According to the present disclosure, by controlling only the power transmitter apparatus based only on the information that can be acquired by the power transmitter apparatus, it is possible to supply the load device with a desired voltage thereof, substantially without depending on the load value of the power receiver apparatus.

BRIEF DESCRIPTION OF DRAWINGS

FIG. 6 is a table showing examples of a coupling coefficient k12 between the power transmitting coil L1 and a power receiving coil L2, the coupling coefficient k12 being calculated for the current I1 flowing through the power transmitting coil L1 and the current I3 generated by the auxiliary coil L3 shown in FIG. 1.

DESCRIPTION OF EMBODIMENTS

Figure 1:
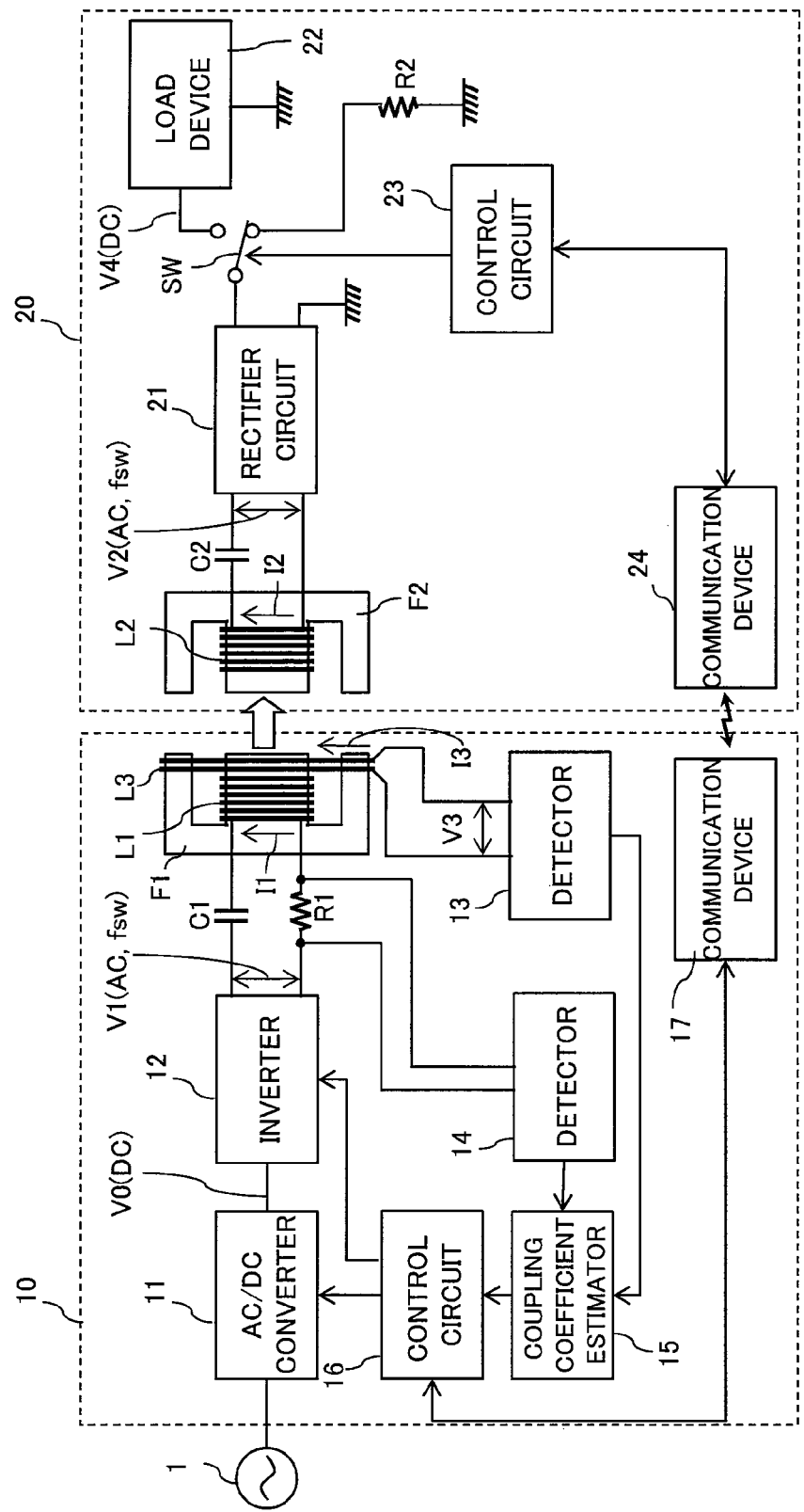
FIG. 1 is a block diagram showing an exemplary configuration of a contactless power transmission system according to a first embodiment.

Hereinafter, embodiments according to one aspect of the present disclosure (hereinafter, also referred to as "the present embodiments") will be described with reference to the drawings. In the drawings, the same reference sign indicates similar components.

First Embodiment

A contactless power transmission system according to a first embodiment will be described with reference to FIG. 1 to FIG. 7.

Application Example of First Embodiment

It is required that a contactless power transmission system, which transmits power from a power transmitter apparatus to a power receiver apparatus in a contactless manner, detect a foreign object located between the power transmitter apparatus and the power receiver apparatus. In order to detect such a foreign object located between the power transmitter apparatus and the power receiver apparatus, it is considered that, for example, the power receiver apparatus calculates a ratio of magnitude of a current actually received by the power receiver apparatus, to a current value notified from the power transmitter apparatus, and requests the power transmitter apparatus to stop power transmission when the ratio is less than a predetermined value. However, in this case, some delay occurs for feedback from the power receiver apparatus to the power transmitter apparatus. Therefore, it is difficult to detect a foreign object before generating heat, and stop power transmission. Alternatively, it is considered to detect a foreign object using a camera, or detect a temperature increase due to a foreign object using a temperature sensor. However, in this case, the size, weight, and cost of the power transmitter apparatus and/or the power receiver apparatus increase. In addition, when trying to detect a foreign object based on only a change in one circuit parameter of the power transmitter apparatus, it is difficult to distinguish whether the change occurs due to an influence of the foreign object, or due to a change in coupling coefficient caused by a change in distance between a power transmitting coil and a power receiving coil. Accordingly, the foreign object cannot be detected, and if continuing power transmission, the foreign object may be heated. Therefore, it is required to surely detect a foreign object through a simple configuration without a camera, a temperature sensor, or the like, and without depending on feedback from the power receiver apparatus to the power transmitter apparatus.

According to the first embodiment, a contactless power transmission system will be described, which is capable of surely detecting a foreign object through a simple configuration, without depending on feedback from a power receiver apparatus to a power transmitter apparatus.

FIG. 1 is a block diagram showing an exemplary configuration of a contactless power transmission system according to the first embodiment. The contactless power transmission system shown in FIG. 1 includes a power transmitter apparatus 10 and a power receiver apparatus 20, and the power transmitter apparatus 10 transmits power to the power receiver apparatus 20 in a contactless manner.

The power transmitter apparatus 10 is provided with at least an AC/DC converter 11, an inverter 12, detectors 13 and 14, a coupling coefficient estimator 15, a control circuit 16, a power transmitting coil L1, and an auxiliary coil L3.

The AC/DC converter 11 converts an AC voltage inputted from an AC power source 1, into a DC voltage V0 having a certain magnitude. The inverter 12 operates at a certain switching frequency fsw, to convert the DC voltage V0 inputted from the AC/DC converter 11, into an AC voltage V1. The voltage V1 is applied across the power transmitting coil L1. The amplitude of the voltage V1 is equal to the magnitude of the voltage V0.

In the present specification, the AC/DC converter 11 and the inverter 12 are collectively referred to as a "power supply circuit". In other words, the power supply circuit generates transmitting power having a predetermined voltage and frequency, and supplies the transmitting power to the power transmitting coil L1.

When the power transmitter apparatus 10 transmits power to the power receiver apparatus 20, the power transmitting coil L1 is electromagnetically coupled to a power receiving coil L2 (to be described later) of the power receiver apparatus 20. In addition, the auxiliary coil L3 is electromagnetically coupled to the power transmitting coil L1.

The detector 13 detects a value of a current I3 or a voltage V3 generated by the auxiliary coil L3. The detector 14 detects a value of a current I1 flowing through the power transmitting coil L1. The values detected by the detectors 13 and 14 are notified to the control circuit 16.

In the present specification, the detector 13 is also referred to as a "first detector", and the detector 14 is also referred to as a "second detector". In addition, in the present specification, the detectors 13 and 14 are collectively referred to as a "detection circuit".

The coupling coefficient estimator 15 estimates a first coupling coefficient k12a between the power transmitting coil L1 and the power receiving coil L2, based on the value of the current I3 or voltage V3 generated by the auxiliary coil L3. The coupling coefficient estimator 15 estimates a second coupling coefficient k12b between the power transmitting coil L1 and the power receiving coil L2, based on the value of the current I1 flowing through the power transmitting coil L1.

The control circuit 16 controls the AC/DC converter 11 and the inverter 12 to start and stop generating the transmitting power.

The power receiver apparatus 20 is provided with at least the power receiving coil L2. A load device 22 is provided inside or outside the power receiver apparatus 20. The load device 22 includes, for example, a battery, a motor, an electric circuit, and/or an electronic circuit. The power received from the power transmitter apparatus 10 via the power receiving coil L2 is supplied to the load device 22.

In the present specification, a voltage V4 applied to the load device 22 is also referred to as an "output voltage" of the power receiver apparatus 20.

When a difference between the first coupling coefficient k12a and the second coupling coefficient k12b is equal to or less than a predetermined threshold, the control circuit 16 of the power transmitter apparatus 10 controls the AC/DC converter 11 and the inverter 12 to transmit power to the power receiver apparatus 20. When the difference between the first coupling coefficient k12a and the second coupling coefficient k12b is greater than the threshold, the control circuit 16 controls the AC/DC converter 11 and the inverter 12 to stop power transmission to the power receiver apparatus 20. Here, the threshold is determined such that the first coupling coefficient k12a and the second coupling coefficient k12b are considered to be substantially equal to each other.

According to the first embodiment, the detectors 13 and 14, the coupling coefficient estimator 15, and the control circuit 16 are collectively referred to as a "control apparatus" of the power transmitter apparatus 10.

A coupling coefficient k12 between the power transmitting coil L1 and the power receiving coil L2 varies depending on a distance between the power transmitting coil L1 and the power receiving coil L2. The coupling coefficient k12 increases as the distance decreases, and the coupling coefficient k12 decreases as the distance increases. In addition, the current I1 flowing through the power transmitting coil L1 varies with certain characteristics, depending on the coupling coefficient k12 between the power transmitting coil L1 and the power receiving coil L2. The current I3 (and/or voltage V3) generated by the auxiliary coil L3 varies with characteristics different from those of the current I1, depending on the coupling coefficient k12 between the power transmitting coil L1 and the power receiving coil L2. The coupling coefficient estimator 15 stores, in advance, a table or formulas indicating a relationship between the current I1 and the coupling coefficient k12, and a relationship between the current I3 (or voltage V3) and the coupling coefficient k12. The coupling coefficient estimator 15 can estimate the coupling coefficients k12a and k12b based on the values of the currents I1 and I3 (alternatively, the current I1 and voltage V3), with reference to such a table or formulas. When no foreign object exists between the power transmitting coil L1 and the power receiving coil L2, it is expected that the estimated coupling coefficients k12a are k12b are equal to each other. On the other hand, when a foreign object exists between the power transmitting coil L1 and the power receiving coil L2, the currents I1 and I3 are differently affected by the foreign object, and as a result, the estimated coupling coefficients k12a and k12b are different from each other.

When a power transmitter apparatus transmits power to a power receiver apparatus in a contactless manner, the power receiver apparatus is not always placed at a fixed position relative to the power transmitter apparatus. For example, consider a case where the power receiver apparatus is an electrically-driven vehicle with a battery, and the power transmitter apparatus is a charging stand for the vehicle. In this case, due to a misalignment of the vehicle from a position in front of the charging stand, or due to a change in distance between the charging stand and the vehicle, deviations of, for example, several millimeters to several tens of millimeters may occur each time the vehicle stops at the charging stand. Accordingly, a distance between the power transmitting coil of the power transmitter apparatus and the power receiving coil of the power receiver apparatus may vary, and therefore, a coupling coefficient between the power transmitting coil and the power receiving coil may vary. When trying to detect a foreign object based on only a change in one circuit parameter of the power transmitter apparatus, it is difficult to distinguish whether the change occurs due to an influence of the foreign object, or due to a change in coupling coefficient caused by a change in distance between the power transmitting coil and the power receiving coil.

On the other hand, according to the contactless power transmission system of the first embodiment, the first coupling coefficient k12a estimated based on the value of the current I3 or voltage V3 generated by the auxiliary coil L3 is compared with the second coupling coefficient k12b estimated based on the value of the current I1 flowing through the power transmitting coil L1, as described above. In other words, according to the contactless power transmission system of the first embodiment, two circuit parameters of the power transmitter apparatus 10 are used in order to detect a foreign object. Thus, it is possible to surely determine whether or not a foreign object exists between the power transmitting coil L1 and the power receiving coil L2, regardless of a change in coupling coefficient between the power transmitting coil L1 and the power receiving coil L2.

As described above, according to the contactless power transmission system of the first embodiment, it is possible to surely detect a foreign object through a simple configuration without a camera, a temperature sensor, or the like, and without depending on feedback from the power receiver apparatus 20 to the power transmitter apparatus 10. By not depending on feedback from the power receiver apparatus 20 to the power transmitter apparatus 10, it is possible to detect a foreign object before generating heat, and facilitate to stop power transmission. In addition, by not including a camera, a temperature sensor, or the like, it is possible to reduce the size, weight, and cost of the power transmitter apparatus 10 and the power receiver apparatus 20, or at least, make the size, weight, and cost less likely to increase.

According to the first embodiment, the power receiver apparatus 20 may be an electronic device with a battery (for example, a laptop computer, a tablet computer, a mobile phone, or the like), and the power transmitter apparatus 10 may be a charger for the power receiver apparatus 20. In addition, according to the first embodiment, the power receiver apparatus 20 may be an electrically-driven vehicle with a battery (for example, an electric vehicle or an automated guided vehicle), and the power transmitter apparatus 10 may a charging stand for the power receiver apparatus 20. In addition, according to the first embodiment, the power receiver apparatus 20 may be a pallet that requires a power source for performing some work on a load during transportation, and the power transmitter apparatus 10 may be a conveyor capable of supplying power to such pallets. In addition, the first embodiment is applicable to a contactless power transmission system in which the distance between the power transmitting coil L1 and the power receiving coil L2 is fixed. In this case, for example, the power transmitter apparatus 10 and the power receiver apparatus 20 may be provided instead of a slip ring, at a joint of a robot arm or the like, in order to supply power to a drive mechanism located at a tip of the robot arm or the like.

Configuration Example of First Embodiment

As shown in FIG. 1, the power transmitter apparatus 10 receives power from the AC power source 1. The AC power source 1 is, for example, a commercial power source.

In the example shown in FIG. 1, the power transmitter apparatus 10 is provided with the AC/DC converter 11, the inverter 12, the detectors 13 and 14, the coupling coefficient estimator 15, the control circuit 16, a communication device 17, a capacitor C1, a magnetic core F1, the power transmitting coil L1, the auxiliary coil L3, and a current detection resistor R1.

The AC/DC converter 11 converts the AC voltage inputted from the AC power source 1, into the DC voltage V0, as described above. The AC/DC converter 11 may convert the AC voltage inputted from the AC power source 1, into a DC voltage V0 having a magnitude variable under the control of the control circuit 16. The AC/DC converter 11 may be provided with a power factor correction circuit. The inverter 12 converts the DC voltage V0 inputted from the AC/DC converter 11, into the AC voltage V1, as described above. The inverter 12 generates, for example, a rectangular AC voltage V1 at the switching frequency fsw. The inverter 12 may operate at a switching frequency fsw variable under the control of the control circuit 16.

The power transmitter apparatus 10 may be provided with the capacitor C1. In this case, the capacitor C1 is connected to the power transmitting coil L1 so as to form an LC resonant circuit. By providing the capacitor C1, it is possible to adjust a gain in output voltage of the power receiver apparatus 20, and improve efficiency of power transmission.

The power transmitter apparatus 10 may be provided with the magnetic core F1. In this case, the power transmitting coil L1 and the auxiliary coil L3 are wound around the magnetic core F1. By winding the power transmitting coil L1 around the magnetic core F1, it is possible to increase magnetic flux density of the power transmitting coil L1, and reduce leakage magnetic flux.

The detector 13 detects the value of the current I3 or voltage V3 generated by the auxiliary coil L3, as described above. The detector 14 uses the current detection resistor R1 to detect the value of the current I1 flowing through the power transmitting coil L1.

The coupling coefficient estimator 15 estimates the first coupling coefficient k12$a$ between the power transmitting coil L1 and the power receiving coil L2, based on the value of the current I3 or voltage V3 generated by the auxiliary coil L3, as described above. In addition, the coupling coefficient estimator 15 estimates the second coupling coefficient k12$b$ between the power transmitting coil L1 and the power receiving coil L2, based on the value of the current I1 flowing through the power transmitting coil L1, as described above.

The control circuit 16 controls the AC/DC converter 11 and the inverter 12 to start and stop generating the transmitting power, as described above. When determining that no foreign object exists between the power transmitting coil L1 and the power receiving coil L2, the control circuit 16 controls the AC/DC converter 11 and the inverter 12 to transmit power to the power receiver apparatus 20. When determining that a foreign object exists between the power transmitting coil L1 and the power receiving coil L2, the control circuit 16 stops the AC/DC converter 11 and the inverter 12. The control circuit 16 may regulate the magnitude of the DC voltage V0 outputted from the AC/DC converter 11, and the switching frequency fsw of the inverter 12. The control circuit 16 includes a central processing unit (CPU), a random access memory (RAM), a read only memory (ROM), and the like, and executes a first power transmission process to be described later.

The power transmitter apparatus 10 may be provided with the communication device 17. In this case, the communication device 17 is communicatively connected to a communication device 24 (to be described later) of the power receiver apparatus 20 by radio (for example, infrared ray) or by wire. The control circuit 16 may receive a signal from the power receiver apparatus 20 via the communication device 17, the signal indicating that the power receiver apparatus 20 has requested power transmission. In addition, the control circuit 16 may receive a signal from the power receiver apparatus 20 via the communication device 17, the signal indicating a value of a voltage and/or current to be supplied to the load device 22, and the like. When the power receiver apparatus 20 has a normal mode and a test mode (to be described later), the control circuit 16 transmits a signal to the power receiver apparatus 20 via the communication device 17, the signal requesting transition to the test mode, or transition to the normal mode.

In the example shown in FIG. 1, the power receiver apparatus 20 is provided with a rectifier circuit 21, the load device 22, a control circuit 23, a communication device 24, a capacitor C2, a magnetic core F2, the power receiving coil L2, a load element R2, and a switch circuit SW.

When the power transmitter apparatus 10 transmits power to the power receiver apparatus 20, the power receiving coil L2 is electromagnetically coupled to the power transmitting coil L1 to generate a current I2 and voltage V2 in the power receiving coil L2.

The power receiver apparatus 20 may be provided with the capacitor C2. In this case, the capacitor C2 is connected to the power receiving coil L2 so as to form an LC resonant circuit. By providing the capacitor C2, it is possible to adjust a gain in output voltage of the power receiver apparatus 20, and improve efficiency of power transmission.

The power receiver apparatus 20 may be provided with the magnetic core F2. In this case, the power receiving coil L2 is wound around the magnetic core F2. By winding the power receiving coil L2 around the magnetic core F2, it is possible to increase magnetic flux density of the power receiving coil L2, and reduce leakage magnetic flux.

The rectifier circuit 21 converts the AC voltage V2 inputted from the power receiving coil L2, into the DC voltage V4. The rectifier circuit 21 may be provided with a smoothing circuit and/or a power factor correction circuit.

The power receiver apparatus 20 may be provided with the control circuit 23, the communication device 24, the load element R2, and the switch circuit SW. In this case, the voltage V4 outputted from the rectifier circuit 21 is selectively supplied to the load device 22 or the load element R2, via the switch circuit SW operating under the control of the control circuit 23. For example, when the load device 22 is a battery, the load device 22 has a variable load value that varies depending on a state of charge of the battery. On the other hand, the load element R2 has a predetermined load value. Here, the load value indicates, for example, the magnitude of the current flowing through the load device 22 or the load element R2. The load element R2 and the switch circuit SW are configured in a manner simpler than that of, for example, a DC/DC converter, and so as to be less likely to affect the efficiency of power transmission to the load device 22. The load element R2 may have a load value smaller than the load value of the load device 22. The power receiver apparatus 20 has the normal mode where the voltage V4 outputted from the rectifier circuit 21 is supplied to the load device 22, and the test mode where the voltage V4 outputted from the rectifier circuit 21 is supplied to the load element R2. The communication device 24 is communicably connected to the communication device 17 of the power transmitter apparatus 10 by radio (for example, infrared ray) or by wire, as described above. The control circuit 23 receives a signal from the power transmitter apparatus 10 via the communication device 24, the signal requesting transition to the test mode, or transition to the normal mode.

When transmitting power in a normal manner, the control circuit 16 of the power transmitter apparatus 10 transmits a signal to the power receiver apparatus 20 using the communication device 17, the signal requesting transition to the normal mode (that is, a signal controlling the switch circuit SW to supply the output voltage of the power receiver apparatus 20 to the load device 22).

When the load device 22 has a variable load value, the current I1 flowing through the power transmitting coil L1 varies with certain characteristics depending on the load value of the load device 22, even when the coupling coefficient k12 between the power transmitting coil L1 and the power receiving coil L2 is constant. Similarly, the current I3 (and/or voltage V3) generated by the auxiliary coil L3 also varies with characteristics different from those of the current I1, depending on the load value of the load device 22. Accordingly, when the load value of the load device 22 varies, it is not possible to accurately estimate the coupling coefficient k12 between the power transmitting coil L1 and the power receiving coil L2, and therefore, it is not possible to correctly determine whether or not a foreign object exists between the power transmitting coil L1 and the power receiving coil L2. Therefore, the control circuit 16 of the power transmitter apparatus 10 transmits a signal to the power receiver apparatus 20, the signal requesting transition to the test mode (that is, a signal controlling the switch circuit SW to supply the output voltage of the power receiver apparatus 20 to the load element R2), and estimates the coupling coefficients k12a and k12b based on the values detected by the detectors 13 and 14 when the power receiver apparatus 20 is in the test mode. Thus, even when the load device 22 has a variable load value, it is possible to correctly determine whether or not a foreign object exists between the power transmitting coil L1 and the power receiving coil L2.

In the present specification, the load device 22 is also referred to as a "first load device", and the load element R2 is also referred to as a "second load device".

The control circuit 23 of the power receiver apparatus 20 may transmit a signal to the power transmitter apparatus 10 via the communication device 24, the signal indicating that the power receiver apparatus 20 has requested power transmission. In addition, the control circuit 23 may transmits a signal to the power transmitter apparatus 10 via the communication device 24, the signal indicating a value of a voltage and/or current to be supplied to the load device 22.

The voltage generated in the power receiver apparatus 20 (voltage V4 outputted from the rectifier circuit 21, or the like) varies depending on the coupling coefficient k12 between the power transmitting coil L1 and the power receiving coil L2. The voltage increases as the coupling coefficient k12 increases, and the voltage decreases as the coupling coefficient k12 decreases. The circuit parameters of the power transmitter apparatus 10 and the power receiver apparatus 20 are determined so as to prevent overvoltage in the power receiver apparatus 20, even when the power transmitter apparatus 10 and the power receiver apparatus 20 operate at a frequency at which the coupling coefficient k12 between the power transmitting coil L1 and the power receiving coil L2 is maximized, and at which the voltage V4 is maximized or locally maximized.

Figure 2:
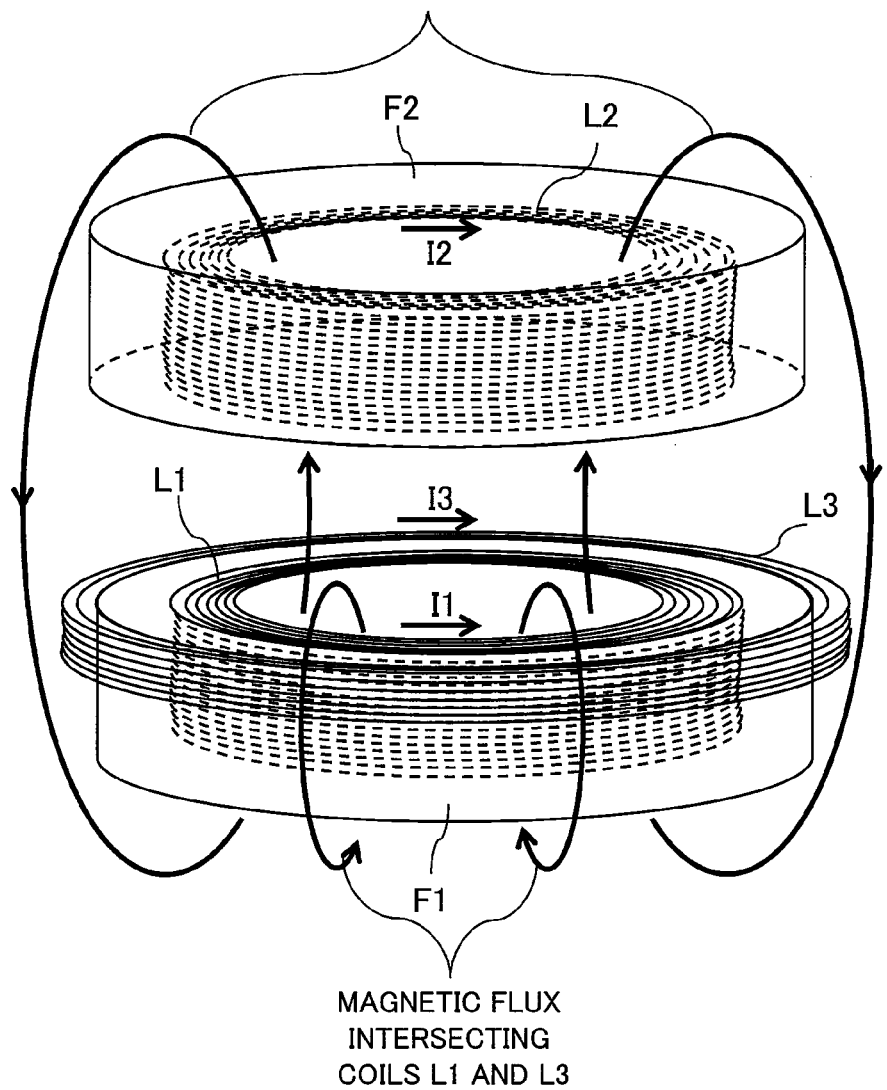
FIG. 2 is a perspective view of an exemplary configuration of magnetic cores F1 and F2 shown in FIG. 1.

FIG. 2 is a perspective view of an exemplary configuration of the magnetic cores F1 and F2 shown in FIG. 1. As described above, the power transmitting coil L1 and the auxiliary coil L3 may be wound around the magnetic core F1, and the power receiving coil L2 may be wound around the magnetic core F2. A part of the magnetic flux generated from the power transmitting coil L1 intersects the auxiliary coil L3 to generate the current I3 and voltage V3 in the auxiliary coil L3. In addition, as shown in FIG. 2, the auxiliary coil L3 may be disposed so as to surround the power transmitting coil L1. By disposing the auxiliary coil L3 in such a manner, it is possible to reduce leakage magnetic flux of the power transmitting coil L1.

The power transmitting coil L1 and the power receiving coil L2 are electromagnetically coupled to each other with the coupling coefficient k12, the power transmitting coil L1 and the auxiliary coil L3 are electromagnetically coupled to each other with a coupling coefficient k13, and the power receiving coil L2 and the auxiliary coil L3 are electromagnetically coupled to each other with a coupling coefficient k23. The power transmitting coil L1, the power receiving coil L2, and the auxiliary coil L3 are configured such that the coupling coefficients k13 and k23 are much smaller than the coupling coefficient k12. The power transmitting coil L1, the power receiving coil L2, and the auxiliary coil L3 may be configured such that the coupling coefficient k23 is smaller than the coupling coefficient k13.

Operation Example of First Embodiment

Figure 3:
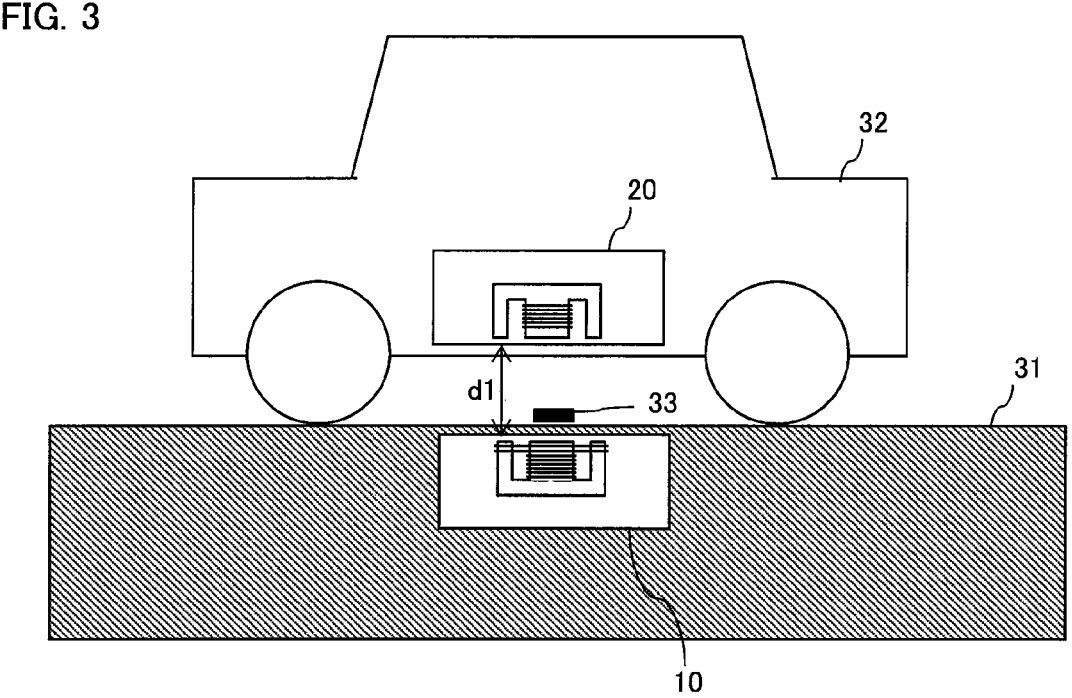
FIG. 3 is a diagram showing an application example of the contactless power transmission system shown in FIG. 1.

FIG. 3 is a diagram showing an application example of the contactless power transmission system shown in FIG. 1. FIG. 3 shows a case where the power receiver apparatus 20 is built into an electrically-driven vehicle 32 with a battery, and the power transmitter apparatus 10 is built into a road surface 31 so as to be able to transmit power to the power receiver apparatus 20 of the vehicle 32. In this case, the battery of the vehicle 32 corresponds to the load device 22 of the power receiver apparatus 20. The power transmitter apparatus 10 and the power receiver apparatus 20 oppose to each other at a distance dl. As shown in FIG. 3, a foreign object 33 may appear between the power transmitting coil L1 and the power receiving coil L2.

Figure 4:
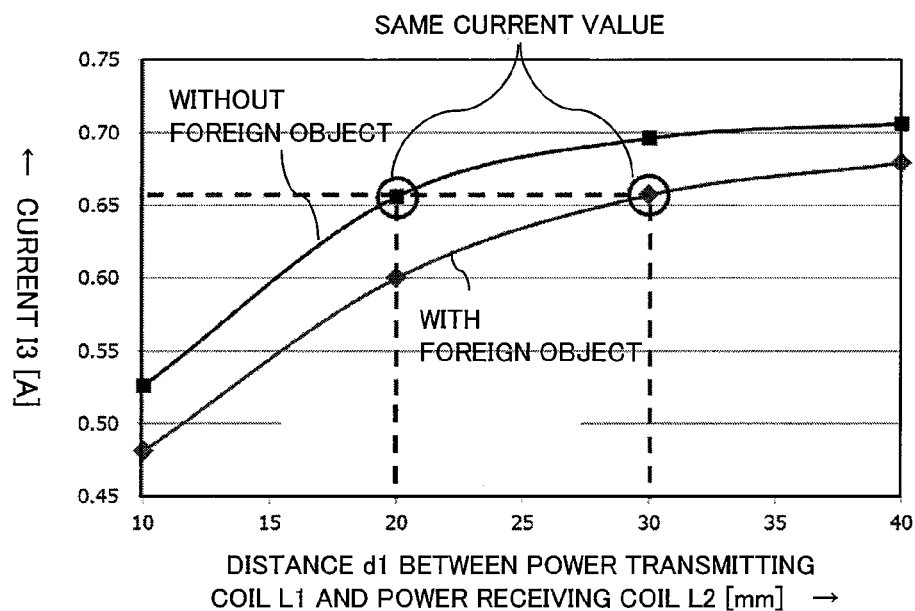
FIG. 4 is a graph showing an example of a change in magnitude of a current I3 generated by an auxiliary coil L3 and detected by a detector 13 shown in FIG. 1.
Figure 5:
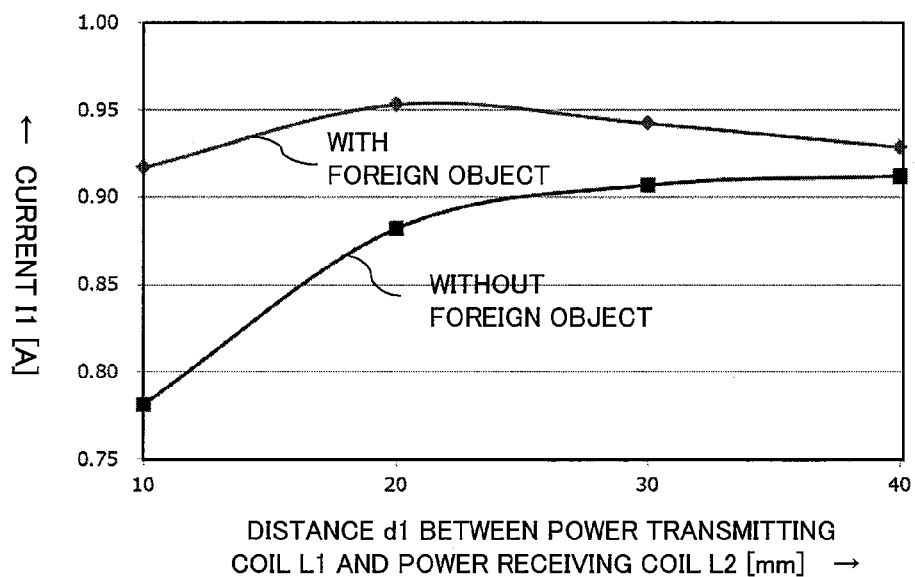
FIG. 5 is a graph showing an example of a change in magnitude of a current I1 flowing through a power transmitting coil L1 and detected by a detector 14 shown in FIG. 1.

FIG. 4 is a graph showing an example of a change in magnitude of the current I3 that is generated by the auxiliary coil L3 and detected by the detector 13 shown in FIG. 1. FIG. 5 is a graph showing an example of a change in magnitude of the current I1 flowing through the power transmitting coil L1 and detected by the detector 14 shown in FIG. 1. As described above, the coupling coefficient k12 between the power transmitting coil L1 and the power receiving coil L2 varies depending on the distance dl between the power transmitting coil L1 and the power receiving coil L2. Therefore, a relationship between the distance dl and the currents I1 and I3 shown in FIGS. 4 and 5 equivalently indicates a relationship between the coupling coefficient k12 and the currents I1 and I3. In addition, as described above, when the foreign object 33 exists between the power transmitting coil L1 and the power receiving coil L2, the currents I1 and I3 are differently affected by the foreign object 33. In the examples shown in FIGS. 4 and 5, when the foreign object 33 exists, the current I3 decreases and the current I1 increases as compared to those of the case where no foreign object 33 exists.

FIG. 6 is a table showing examples of the coupling coefficient k12 between the power transmitting coil L1 and the power receiving coil L2, the coupling coefficient k12 being calculated for the current I1 flowing through the power transmitting coil L1 and the current I3 generated by the auxiliary coil L3 shown in FIG. 1. FIG. 6 shows the currents I1 and I3 and the coupling coefficient k12, when the power receiver apparatus 20 is in the test mode, and no foreign object 33 exists between the power transmitting coil L1 and the power receiving coil L2. The coupling coefficient estimator 15 stores, in advance, the table indicating the relationship between the currents I1 and I3 and the coupling coefficient k12 as shown in FIG. 6. The coupling coefficient estimator 15 estimates the first coupling coefficient k12a between the power transmitting coil L1 and the power receiving coil L2, by referring to the table based on the value of the current I3. The coupling coefficient estimator 15 estimates the second coupling coefficient k12b between the power transmitting coil L1 and the power receiving coil L2, by referring to the table based on the value of the current I1. When no foreign object 33 exists between the power transmitting coil L1 and the power receiving coil L2, it is expected that the coupling coefficient k12a estimated based on the value of the current I3 is equal to the coupling coefficient k12b estimated based on the value of the current I1. On the other hand, when the foreign object 33 exists between the power transmitting coil L1 and the power receiving coil L2, the currents I1 and I3 are differently affected by the foreign object 33, and as a result, the coupling coefficient k12a estimated based on the value of the current I3 is different from the coupling coefficient k12b estimated based on the value of the current I1. Therefore, it is possible to determine whether or not the foreign object 33 exists between the power transmitting coil L1 and the power receiving coil L2, based on whether or not the coupling coefficients k12a and k12b are equal to each other.

When the estimated coupling coefficients k12a and k12b are substantially equal to each other, that is, when the difference between the coupling coefficients k12a and k12b is less than or equal to the predetermined threshold, the control circuit 16 may determine that the coupling coefficients k12a and k12b are equal to each other.

The coupling coefficient estimator 15 may store, in advance, formulas indicating the relationship between the currents I1 and I3 and the coupling coefficient k12, instead of the table as shown in FIG. 6. For example, the coupling coefficient k12a may be estimated based on the current I1 flowing through the power transmitting coil L1, as follows.

$$k12a = e^{I1} + a$$

Where "a" on the right side is a constant.

In addition, the current I1 and the coupling coefficient k12a may have the following relationship.

$$I1 = 1 + k12a + (k12a)^2 + \ldots + (k12a)^n$$

By solving this equation for the coupling coefficient k12a, the coupling coefficient k12a may be estimated based on the current I1.

The formulas for estimating the coupling coefficient k12a based on the current I1 are not limited to the examples given above.

Also in a case where the coupling coefficient k12b is estimated based on the current I3 flowing through the auxiliary coil L3, the coupling coefficient k12b can be estimated using some formula in a similar manner as that of the case where the coupling coefficient k12a is estimated based on the current I1.

FIGS. 4 and 6 shows the case of detecting the value of the current I3 generated by the auxiliary coil L3. Also in the case of detecting the value of the voltage V3 generated by the auxiliary coil L3, the coupling coefficient k12b between the power transmitting coil L1 and the power receiving coil L2 can be estimated in a substantially similar manner.

Figure 7:
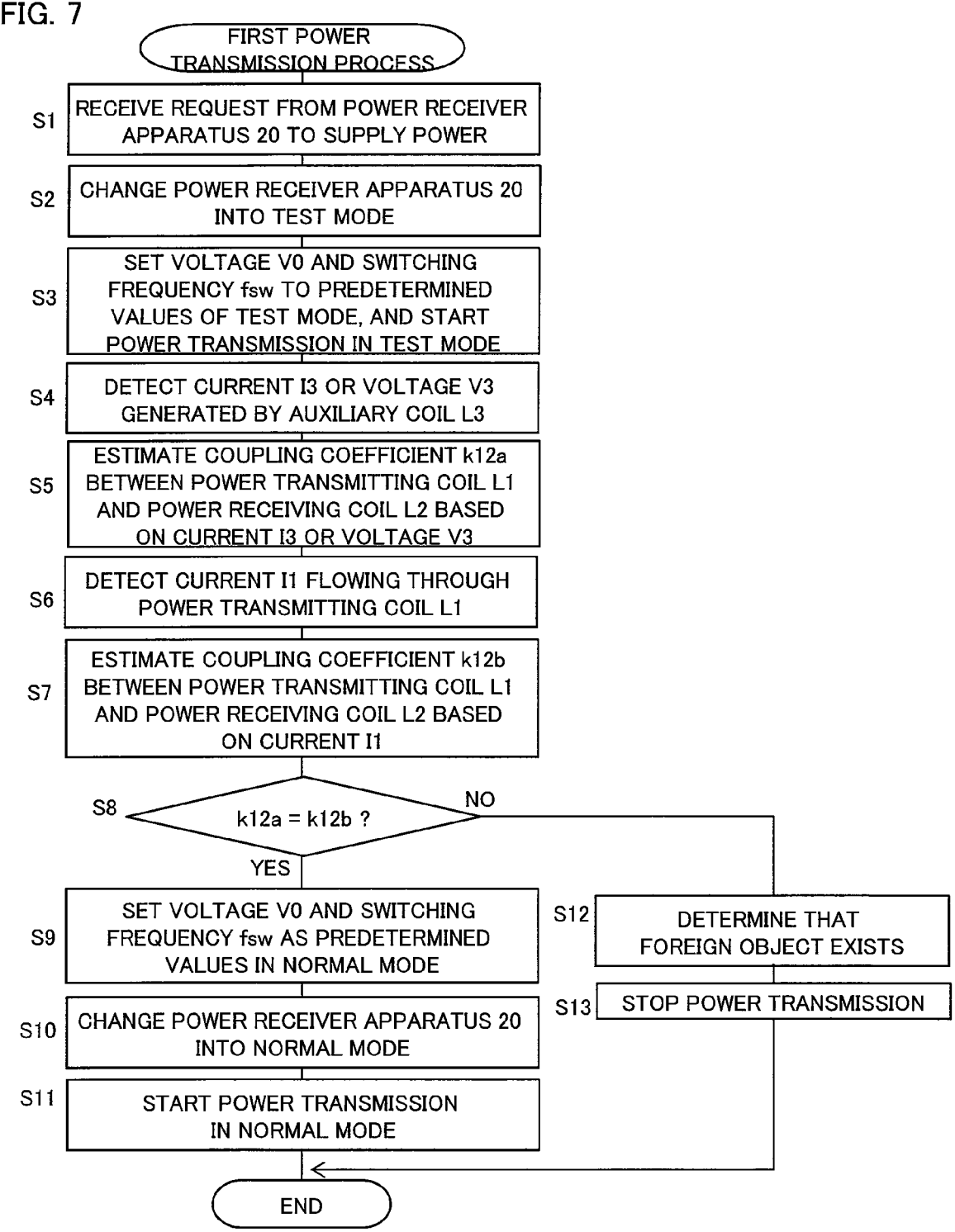
FIG. 7 is a flowchart showing a first power transmission process executed by a control circuit 16 shown in FIG. 1.

FIG. 7 is a flowchart showing a first power transmission process executed by the control circuit 16 shown in FIG. 1.

In step S1, the control circuit 16 receives a signal from the power receiver apparatus 20 via the communication device 17, the signal indicating that the power receiver apparatus 20 has requested power transmission.

In step S2, the control circuit 16 transmits a signal to the power receiver apparatus 20 via the communication device 17, the signal requesting transition to the test mode. When receiving the signal requesting transition to the test mode, from the power transmitter apparatus 10 via the communication device 24, the control circuit 23 of the power receiver apparatus 20 controls the switch circuit SW to supply the voltage V4 outputted from the rectifier circuit 21, to the load element R2. In step S3, the control circuit 16 sets the voltage V0 outputted from the AC/DC converter 11, and the switching frequency fsw of the inverter 12, to predetermined values for the test mode, and starts power transmission in the test mode. As described above, the voltage generated in the power receiver apparatus 20 varies depending on the coupling coefficient k12 between the power transmitting coil L1 and the power receiving coil L2, but the coupling coefficient k12 is unknown until completion of the test mode. Therefore, in order to prevent overvoltage in the power receiver apparatus 20, the control circuit 16 sets the voltage V0 outputted from the AC/DC converter 11, to a predetermined non-zero minimum, and sets the switching frequency fsw of the inverter 12 to the maximum. The minimum of the voltage V0 is set such that the currents I1 and I3 (alternatively, the current I1 and the voltage V3), with which the coupling coefficients k12a and k12b can be detected, are generated by the power transmitting coil L1 and the auxiliary coil L3. The minimum of the voltage V0 and the maximum of the switching frequency fsw are used as the predetermined values for the test mode.

In step S4, the control circuit 16 detects the value of the current I3 or voltage V3 generated by the auxiliary coil L3, using the detector 13. In step S5, the control circuit 16 estimates the coupling coefficient k12a between the power transmitting coil L1 and the power receiving coil L2, using the coupling coefficient estimator 15, by referring to the table or formulas based on the value of the detected current I3 or voltage V3.

In step S6, the control circuit 16 detects the value of the current I1 flowing through the power transmitting coil L1, using the detector 14. In step S7, the control circuit 16 estimates the coupling coefficient k12b between the power transmitting coil L1 and the power receiving coil L2, using the coupling coefficient estimator 15, by referring to the table or formulas based on the value of the detected current I1.

In step S8, the control circuit 16 determines whether or not the estimated coupling coefficients k12a and k12b are substantially equal to each other; if YES, the process proceeds to step S9, and if NO, the process proceeds to step S12.

In step S9, the control circuit 16 sets the voltage V0 outputted from the AC/DC converter 11, and the switching frequency fsw of the inverter 12, to predetermined values for the normal mode. The control circuit 16 sets the voltage V0 outputted from the AC/DC converter 11, to a value predetermined in accordance with the value of the voltage and/or current to be supplied to the load device 22. The control circuit 16 sets the switching frequency fsw of the inverter 12, for example, to a transmitting frequency at least locally minimizing the dependence of the output voltage of the power receiver apparatus 20 on the load value of the power receiver apparatus 20, as described in the second embodiment. Such values of the voltage V0 and switching frequency fsw are used as the predetermined values for the normal mode. In step S10, the control circuit 16 transmits a signal to the power receiver apparatus 20 via the communication device 17, the signal requesting transition to the normal mode. When receiving the signal requesting transition to the normal mode, from the power transmitter apparatus 10 via the communication device 24, the control circuit 23 of the power receiver apparatus 20 controls the switch circuit SW to supply the voltage V4 outputted from the rectifier circuit 21, to the load device 22. In step S11, the control circuit 16 starts power transmission in the normal mode.

In step S12, the control circuit 16 determines that a foreign object exists. In step S13, the control circuit 16 stops transmitting power.

[Advantageous Effects of First Embodiment]

According to the contactless power transmission system of the first embodiment, it is possible to surely detect a foreign object through a simple configuration without a camera, a temperature sensor, or the like, and without depending on feedback from the power receiver apparatus 20 to the power transmitter apparatus 10.

According to the contactless power transmission system of the first embodiment, it is possible to stop power transmission when detecting a foreign object, thus improving the safety of the contactless power transmission system.

According to the contactless power transmission system of the first embodiment, when the coupling coefficient k12a estimated based on the value of the current I3 or voltage V3 is equal to the coupling coefficient k12b estimated based on the value of the current I1, it is possible to accurately estimate the coupling coefficient k12 between the power transmitting coil L1 and the power receiving coil L2.

In the case of estimating the coupling coefficient between the power transmitting coil and the power receiving coil based on one circuit parameter, and comparing the estimated coupling coefficient with some threshold, it is difficult to distinguish whether the coupling coefficient has varied due to the influence of the foreign object or due to other factors (such as a change in distance between the power transmitting coil and the power receiving coil). In addition, in this case, it is only possible to determine whether the estimated coupling coefficient is higher or lower than the threshold, and therefore, it is not possible to take the strength of the coupling coefficient into consideration. On the other hand, according to the contactless power transmission system of the first embodiment, it is possible to surely detect a foreign object regardless of whether the coupling coefficients are high or low, by determining whether or not the two estimated coupling coefficients k12a and k12b are substantially equal to each other.

Second Embodiment

A contactless power transmission system according to a second embodiment will be described with reference to FIG. 8 to FIG. 12.

Application Example of Second Embodiment

As described above, when the power transmitter apparatus transmits power to the power receiver apparatus in a contactless manner, the power receiver apparatus is not always placed at a fixed position relative to the power transmitter apparatus. Therefore, a distance between q power transmitting coil of the power transmitter apparatus and q power receiving coil of the power receiver apparatus may vary, and a coupling coefficient between the power transmitting coil and the power receiving coil may vary accordingly. When the coupling coefficient between the power transmitting coil and the power receiving coil varies, a voltage and/or current supplied from the power receiver apparatus to a load device varies accordingly.

In order for the power receiver apparatus to supply the load device with a desired voltage thereof, it may be possible to, for example, feed an output voltage value and/or output current value of the power receiver apparatus back to the power transmitter apparatus, and regulate a voltage applied to the power transmitting coil. However, in this case, in order to feed back the output voltage value and/or output current value of the power receiver apparatus to the power transmitter apparatus, some delay occurs, and it is difficult to follow rapid variations in a load value of the power receiver apparatus. In addition, in order for the power receiver apparatus to supply the load device with a desired voltage thereof, it may be possible to, for example, provide the power receiver apparatus with a DC/DC converter. However, in this case, the size, weight, and cost of the power receiver apparatus increase. Therefore, it is required to control the power transmitter apparatus to supply the load device with a desired voltage thereof, without depending on the feedback from the power receiver apparatus to the power transmitter apparatus, and without providing the power receiver apparatus with extra circuits (DC/DC converter or the like).

According to the second embodiment, a contactless power transmission system will be described, which is capable of controlling only the power transmitter apparatus based only on information that can be acquired by the power transmitter apparatus, to supply a load device with a desired voltage thereof.

The contactless power transmission system according to the second embodiment is configured in a substantially similar manner as that of the contactless power transmission system according to the first embodiment. Hereinafter, the contactless power transmission system according to the second embodiment will be described with reference to FIG. 1.

The contactless power transmission system according to the second embodiment includes the power transmitter apparatus 10 and the power receiver apparatus 20, and the power transmitter apparatus 10 transmits power to the power receiver apparatus 20 in a contactless manner.

The power transmitter apparatus 10 is provided with at least the AC/DC converter 11, the inverter 12, detectors 13 and 14, the control circuit 16, the power transmitting coil L1, and the auxiliary coil L3.

The AC/DC converter 11 converts the AC voltage inputted from the AC power source 1, into the DC voltage V0 having a magnitude variable under the control of the control circuit 16. The inverter 12 operates at the switching frequency fsw variable under the control of the control circuit 16, and converts the DC voltage V0 inputted from the AC/DC converter 11, into the AC voltage V1. The voltage V1 is applied across the power transmitting coil L1. The amplitude of the voltage V1 is equal to the magnitude of the voltage V0. In other words, the AC/DC converter 11 and the inverter 12 (power supply circuit) generate transmitting power having a variable voltage and a variable frequency, and supply the transmitting power to the power transmitting coil L1.

The power transmitting coil L1 and the auxiliary coil L3 of the contactless power transmission system according to the second embodiment are configured in a similar manner as that of the power transmitting coil L1 and the auxiliary coil L3 of the contactless power transmission system according to the first embodiment, respectively.

The detectors 13 and 14 (detection circuit) detect at least one of the value of the current flowing through the power transmitting coil L1, and the value of the current or voltage generated by the auxiliary coil L3. The values detected by the detectors 13 and 14 are notified to the control circuit 16.

The control circuit 16 regulates the magnitude of the voltage V0 outputted from the AC/DC converter 11, and the switching frequency fsw of the inverter 12.

The power receiver apparatus 20 of the contactless power transmission system according to the second embodiment is configured in a similar manner as that of the power receiver apparatus 20 of the contactless power transmission system according to the first embodiment.

The control circuit 16 of the power transmitter apparatus 10 determines a transmitting frequency based on the values detected by the detectors 13 and 14 (detection circuit), the transmitting frequency at least locally minimizing the dependence of the output voltage of the power receiver apparatus 20 on the load value of the power receiver apparatus 20. In the present specification, such a frequency is also referred to as a "load-independent transmitting frequency". The control circuit 16 determines a voltage for the transmitting power at which the output voltage of the power receiver apparatus 20 is equal to a predetermined target voltage when generating the transmitting power having the determined transmitting frequency. The control circuit 16 controls the AC/DC converter 11 and the inverter 12 (power supply circuit) to generate the transmitting power having the determined frequency and the determined voltage.

According to the second embodiment, the detectors 13 and 14 and the control circuit 16 are collectively referred to as a "control apparatus" of the power transmitter apparatus 10.

The voltage V4 applied to the load device 22 (output voltage of the power receiver apparatus 20) varies depending on the coupling coefficient k12 between the power transmitting coil L1 and the power receiving coil L2. The voltage V4 applied to the load device 22 also varies depending on the load value of the load device 22. The voltage V4 decreases as the load value increases, and the voltage V4 increases as the load value decreases. Even under such conditions, it is required to control the power transmitter apparatus 10 to supply the load device 22 with a desired voltage thereof.

The contactless power transmission system according to the second embodiment determines a transmitting frequency based on the values detected by the detectors 13 and 14, the transmitting frequency at least locally minimizing the dependence of the output voltage of the power receiver apparatus 20 on the load value of the power receiver apparatus 20, as described above. In addition, the contactless power transmission system according to the second embodiment determines the voltage for the transmitting power at which the output voltage of the power receiver apparatus 20 is equal to the predetermined target voltage (that is, a desired voltage of the load device 22) when generating the transmitting power having the determined transmitting frequency, as described above. Here, the "voltage for the transmitting power" means the amplitude of transmitting power. In addition, the contactless power transmission system according to the second embodiment controls the AC/DC converter 11 and the inverter 12 to generate the transmitting power having the determined frequency and the determined voltage, as described above. Thus, by controlling only the power transmitter apparatus 10 based only on the information that can be acquired by the power transmitter apparatus 10, it is possible to supply the load device 22 with a desired voltage thereof, substantially without depending on the load value of the power receiver apparatus 20 (the magnitude of the current flowing through the load device 22). It is not necessary to monitor variations in the load value of the power receiver apparatus 20, thus eliminating the need for feedback from the power receiver apparatus 20 to the power transmitter apparatus 10, and facilitating to follow rapid variations in the load value. In addition, by eliminating the need for providing the power receiver apparatus with extra circuits (DC/DC converter or the like), it is possible to reduce the size, weight, and cost of the power receiver apparatus 20, or at least, make the size, weight, and cost less likely to increase.

According to the second embodiment, the power receiver apparatus 20 may be an electronic device with a battery, and the power transmitter apparatus 10 may be a charger for the power receiver apparatus 20, in a manner similar to that of the first embodiment. In addition, according to the second embodiment, the power receiver apparatus 20 may be an electrically-driven vehicle with a battery, and the power transmitter apparatus 10 may a charging stand for the power receiver apparatus 20, in a manner similar to that of the first embodiment. In addition, according to the second embodiment, the power receiver apparatus 20 may be a pallet that requires a power source, and the power transmitter apparatus 10 may be a conveyor capable of supplying power to such pallets, in a manner similar to that of the first embodiment. In addition, according to the second embodiment, the power transmitter apparatus 10 and the power receiver apparatus 20 may be provided instead of a slip ring, at a joint of a robot arm or the like, in a manner similar to that of the first embodiment.

Configuration Example of Second Embodiment

As described above, the contactless power transmission system according to the second embodiment is configured in a substantially similar manner as that of the contactless power transmission system according to the first embodiment. However, the control circuit 16 of the power transmitter apparatus 10 is configured to execute a second power transmission process to be described later with reference to FIG. 8, instead of the first power transmission process shown in FIG. 7. Therefore, the control circuit 16 stores, in advance, a table or formulas as described below.

The control circuit 16 stores, in advance, a table or formulas indicating a relationship between the coupling coefficient k12 between the power transmitting coil L1 and the power receiving coil L2, and the load-independent transmitting frequency. Alternatively, the coupling coefficient estimator 15 may be omitted, and the values detected by the detectors 13 and 14 may be directly inputted to the control circuit 16. In this case, the control circuit 16 may store, in advance, a table or formulas indicating a relationship between at least one of the value of the current flowing through the power transmitting coil L1 and the value of the current or voltage generated by the auxiliary coil L3, and the load-independent transmitting frequency. By referring to the table or formulas. the control circuit 16 can determine a transmitting frequency (that is, the switching frequency fsw of the inverter 12) at least locally minimizing the dependence of the output voltage of the power receiver apparatus 20 on the load value of the power receiver apparatus 20.

The control circuit 16 further stores, in advance, a table or formulas indicating a relationship between the voltage V0 outputted from the AC/DC converter 11 and the output voltage of the power receiver apparatus 20, for various coupling coefficients k12 between the power transmitting coil L1 and the power receiving coil L2. By referring to the table or formulas, the control circuit 16 can determine the voltage for the transmitting power at which the output voltage of the power receiver apparatus 20 is equal to the predetermined target voltage.

By referring to these tables or formulas, the control circuit 16 executes a second power transmission process (or a third or fourth power transmission process) to be described later.

In addition, the control circuit 16 may transmit a signal to the power receiver apparatus 20 using the communication device 17 the signal requesting transition to the test mode. The control circuit 16 may determine the load-independent transmitting frequency based on the values detected by the detectors 13 and 14 when the power receiver apparatus 20 is in the test mode. Thus, it is possible to correctly determine the load-independent transmitting frequency, even when the load device 22 has a variable load value. Then, by controlling only the power transmitter apparatus 10 based only on the information that can be acquired by the power transmitter apparatus 10, it is possible to supply the load device 22 with a desired voltage thereof, substantially without depending on the load value of the power receiver apparatus 20 (the magnitude of the current flowing through the load device 22).

The control circuit 16 may determine the load-independent transmitting frequency based on the coupling coefficient k12 between the power transmitting coil L1 and the power receiving coil L2 estimated by the coupling coefficient estimator 15.

The coupling coefficient estimator 15 may estimate the first coupling coefficient k12a between the power transmitting coil L1 and the power receiving coil L2, based on the value of the current or voltage generated by the auxiliary coil L3, and estimate the second coupling coefficient k12b between the power transmitting coil L1 and the power receiving coil L2, based on the value of the current flowing through the power transmitting coil L1. When the first coupling coefficient k12a and the second coupling coefficient k12b are substantially equal to each other, the control circuit 16 may control the AC/DC converter 11 and the inverter 12 to generate transmitting power having the determined frequency and the determined voltage. In addition, when the first coupling coefficient k12a and the second coupling coefficient k12b are different from each other, the control circuit 16 may control the AC/DC converter 11 and the inverter 12 to stop power transmission to the power receiver apparatus 20. Thus, the control circuit 16 can correctly and surely determine whether or not a foreign object exists between the power transmitting coil L1 and the power receiving coil L2, regardless of a change in the coupling coefficient between the power transmitting coil L1 and the power receiving coil L2.

Operation Example of Second Embodiment

Figure 8:
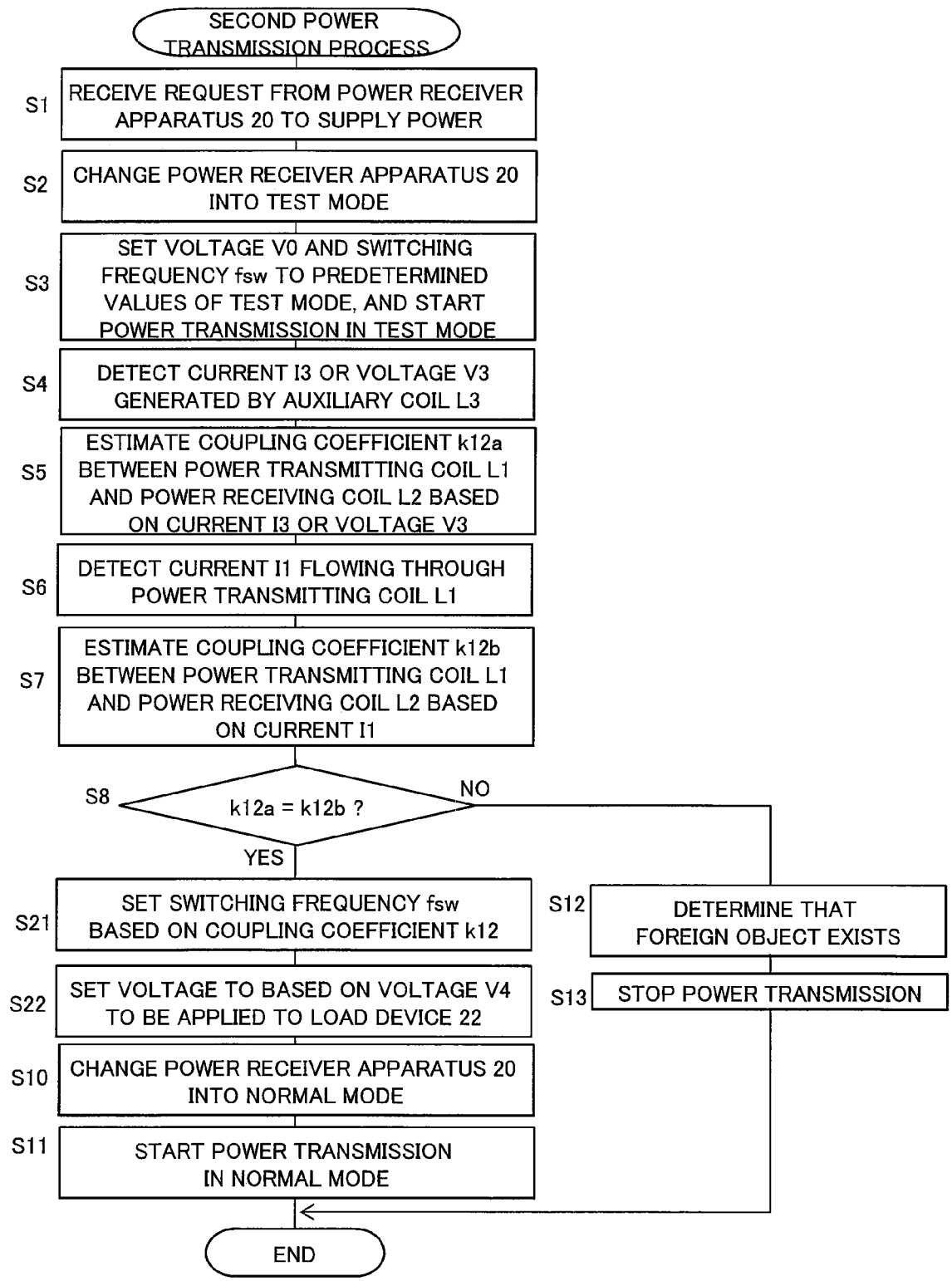
FIG. 8 is a flowchart showing a second power transmission process executed by a control circuit 16 of a contactless power transmission system according to a second embodiment.

FIG. 8 is a flowchart showing a second power transmission process executed by the control circuit 16 of the contactless power transmission system according to the second embodiment. In the second power transmission process shown in FIG. 8, the control circuit 16 executes steps S21 and S22, instead of step S9 shown in FIG. 7.

In step S21, the control circuit 16 sets the switching frequency fsw of the inverter 12 based on the coupling coefficient k12 (equal to k12a and k12b) between the power transmitting coil L1 and the power receiving coil L2. In step S22, the control circuit 16 sets the voltage V0 outputted from the AC/DC converter 11 based on the voltage V4 to be applied to the load device 22.

Figure 9:
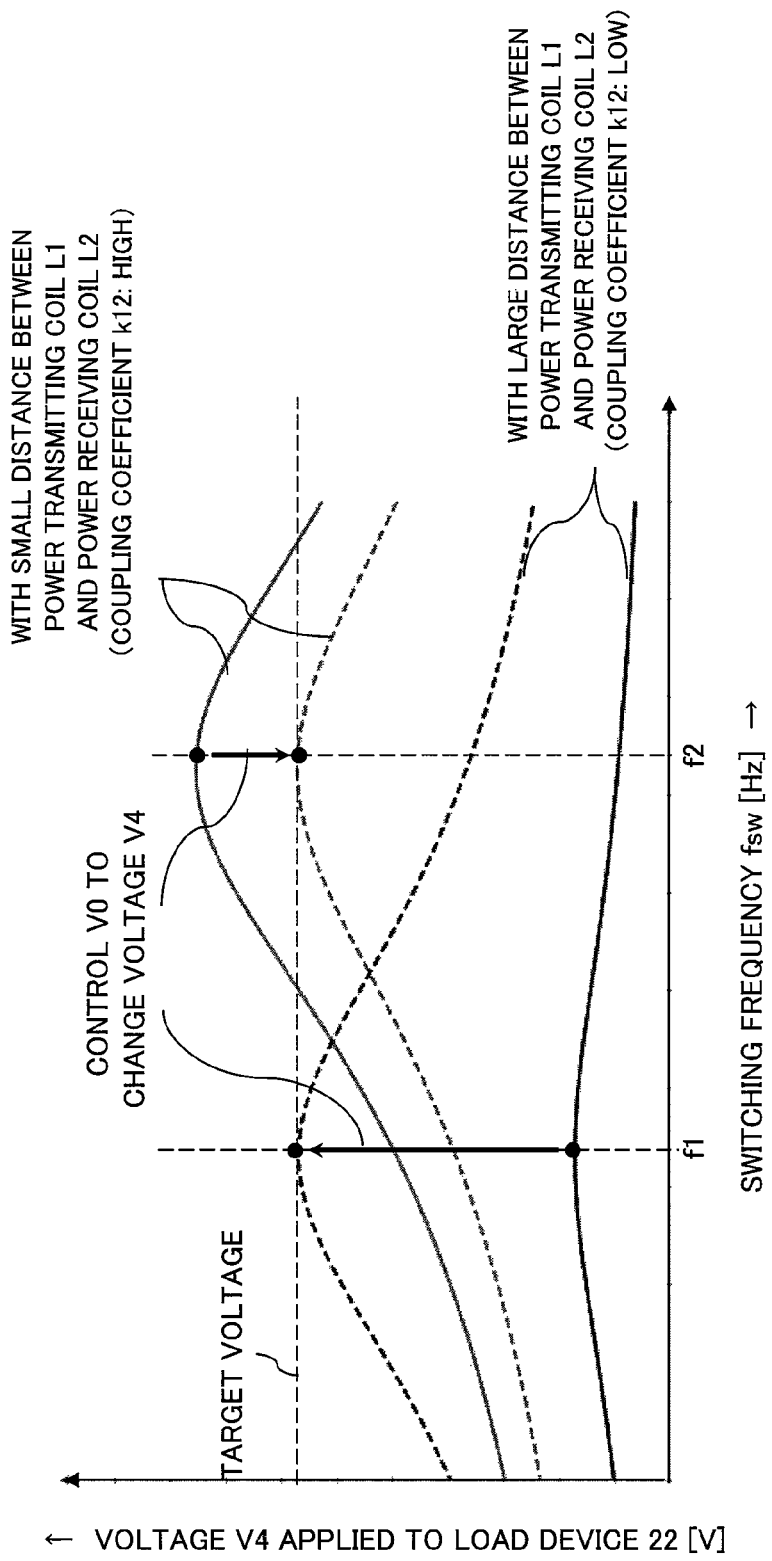
FIG. 9 is an exemplary graph illustrating that an output voltage of a power receiver apparatus 20 shown in FIG. 1 varies depending on the coupling coefficient k12 between the power transmitting coil L1 and the power receiving coil L2, and depending on a voltage V0 of a power transmitter apparatus 10.

FIG. 9 is an exemplary graph illustrating that the output voltage of the power receiver apparatus 20 shown in FIG. 1 varies depending on the coupling coefficient k12 between the power transmitting coil L1 and the power receiving coil L2, and depending on the voltage V0 of the power transmitter apparatus 10. In the case of a large distance dl between the power transmitting coil L1 and the power receiving coil L2, and a low coupling coefficient k12, the voltage V4 is at a local maximum when the switching frequency fsw is set to f1. In the case of a small distance dl between the power transmitting coil L1 and the power receiving coil L2, and a high coupling coefficient k12, the voltage V4 is at a local maximum when the switching frequency fsw is set to f2. Here, the word "large" or "small" of the distance dl, and the word "high" or "low" of the coupling coefficient k12 mean a relative magnitude thereof. The control circuit 16 sets the switching frequency fsw of the inverter 12 in accordance with the load-independent transmitting frequency. When the voltage V4 applied to the load device 22 is less than the target voltage, the control circuit 16 increases the voltage V0 outputted from the AC/DC converter 11 to increase the voltage V4 to the target voltage. When the voltage V4 applied to the load device 22 is greater than the target voltage, the control circuit 16 reduces the voltage V0 outputted from the AC/DC converter 11 to reduce the voltage V4 to the target voltage.

Figure 10:
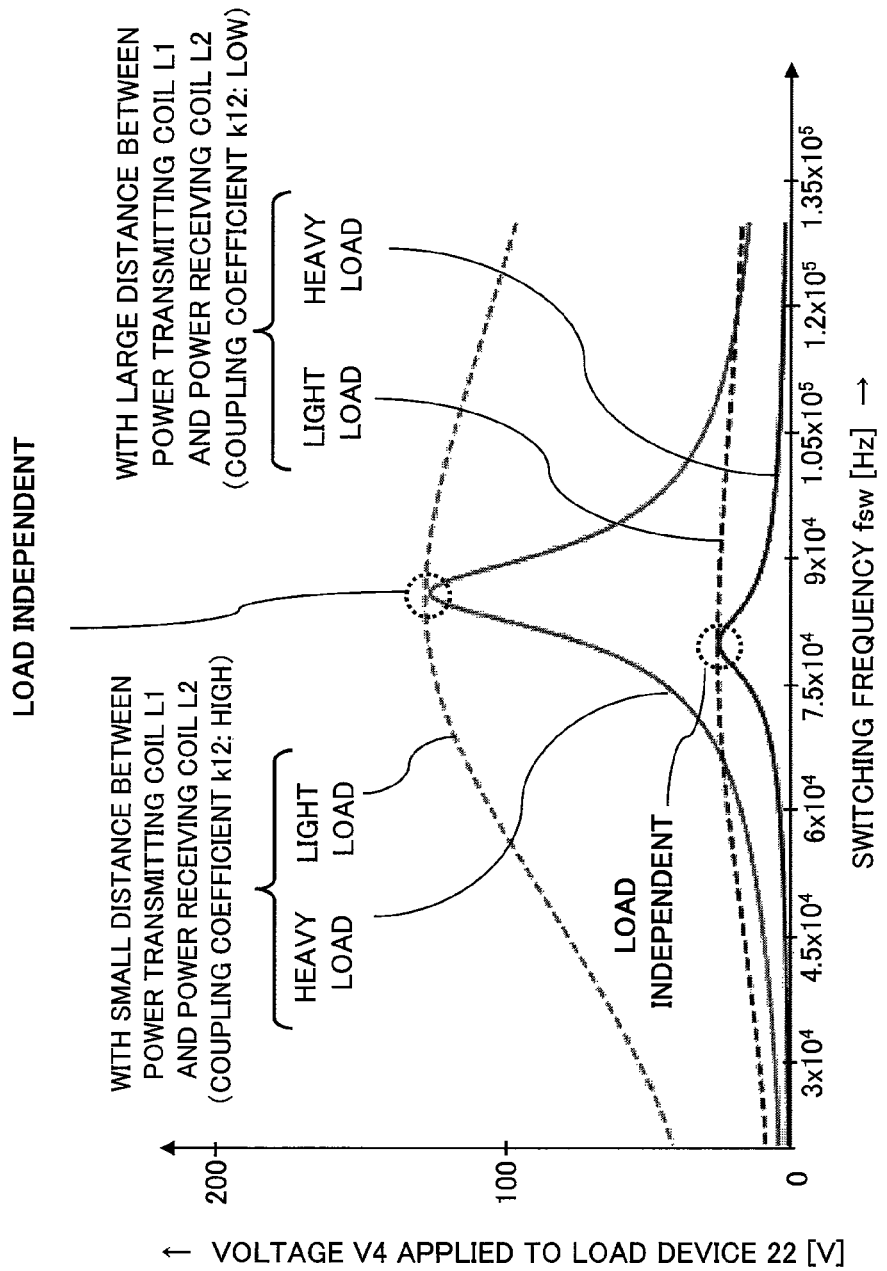
FIG. 10 is an exemplary graph illustrating that the output voltage of the power receiver apparatus 20 shown in FIG. 1 varies depending on the coupling coefficient k12 between the power transmitting coil L1 and the power receiving coil L2, and depending on a load value of a load device 22.

FIG. 10 is an exemplary graph illustrating that the output voltage of the power receiver apparatus 20 shown in FIG. 1 varies depending on the coupling coefficient k12 between the power transmitting coil L1 and the power receiving coil L2, and depending on the load value of the load device 22. FIG. 10 shows a case where a constant voltage V0 is outputted from the AC/DC converter 11. For example, when the load device 22 is a battery, the load device 22 has a variable load value that varies depending on a state of charge of the battery. As described above, the voltage V4 applied to the load device 22 varies depending on the load value of the load device 22. However, as shown in FIG. 10, when transmitting power having a certain switching frequency fsw, the dependence of the voltage V4 on the load value is at least locally minimized, and the voltage V4 becomes substantially constant regardless of the load value of the load device 22. The load-independent transmitting frequency may be equal to or different from the switching frequency fsw at which the voltage V4 is maximized. Therefore, by setting the switching frequency fsw of the inverter 12 in accordance with such a load-independent transmitting frequency, it is not necessary to control the power transmitter apparatus 10 and/or the power receiver apparatus 20 in accordance with the load value of the load device 22. Thus, it is not necessary to monitor the load value of the load device 22 and feed back the load value from the power receiver apparatus 20 to the power transmitter apparatus 10, and also not necessary to provide the power receiver apparatus 20 with extra circuits (DC/DC converter or the like) in order to supply the load device 22 with a desired voltage thereof.

First Modified Embodiment of Second Embodiment

Figure 11:
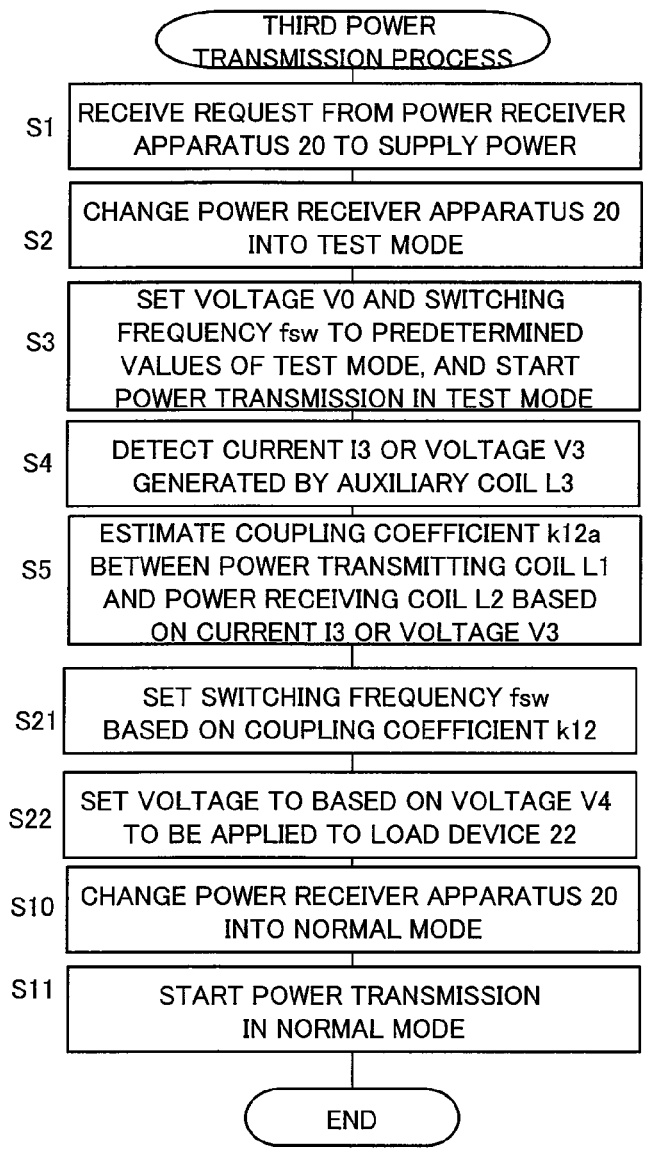
FIG. 11 is a flowchart showing a third power transmission process executed by a control circuit 16 of a contactless power transmission system according to a first modified embodiment of the second embodiment.

FIG. 11 is a flowchart showing a third power transmission process executed by the control circuit 16 of the contactless power transmission system according to a first modified embodiment of the second embodiment. When it is assumed that no foreign object exists between the power transmitting coil L1 and the power receiving coil L2, steps S6 to S8, S12, and S13 shown in FIG. 8 may be omitted. In this case, the current detection resistor R1 and the detector 14 shown in FIG. 1 may be omitted. Thus, it is possible to simplify the configuration and operation of the power transmitter apparatus 10, as compared with those of FIG. 1 and FIG. 8.

Second Modified Embodiment of Second Embodiment

Figure 12:
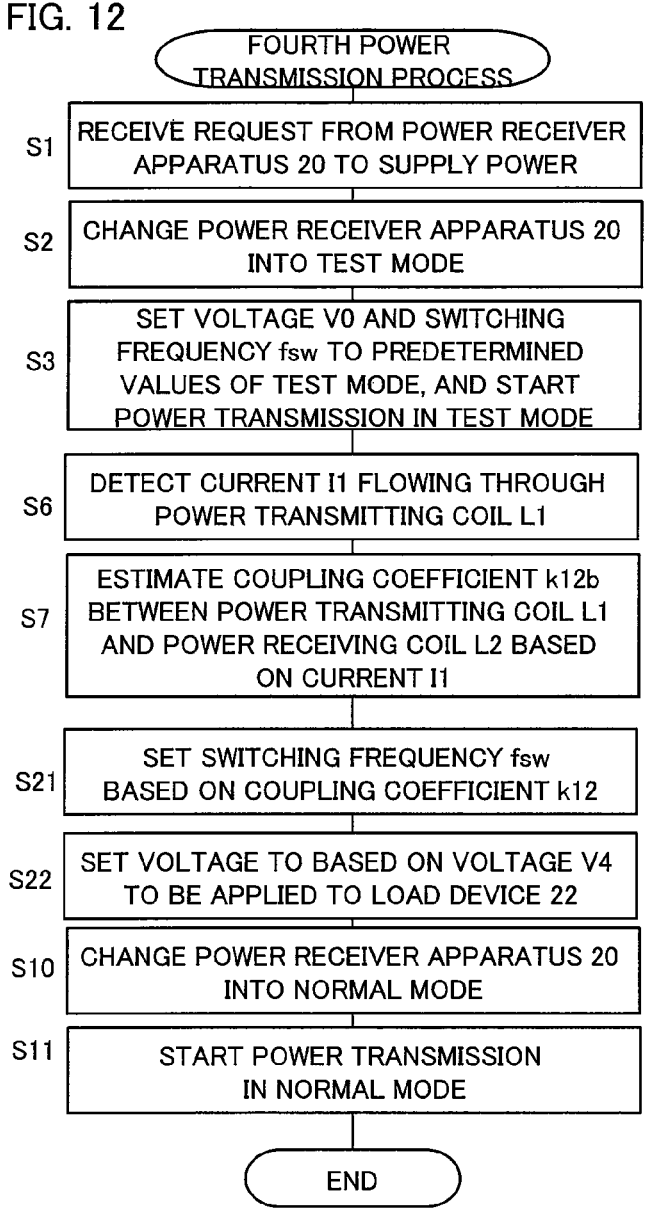
FIG. 12 is a flowchart showing a fourth power transmission process executed by a control circuit 16 of a contactless power transmission system according to a second modified embodiment of the second embodiment.

FIG. 12 is a flowchart showing a fourth power transmission process executed by the control circuit 16 of the contactless power transmission system according to a second modified embodiment of the second embodiment. When it is assumed that no foreign object exists between the power transmitting coil L1 and the power receiving coil L2, steps S4, S5, S8, S12, and S13 shown in FIG. 8 may be omitted.

In this case, the auxiliary coil L3 and the detector 13 shown in FIG. 1 may be omitted. Thus, it is possible to simplify the configuration and operation of the power transmitter apparatus 10, as compared with those of FIGS. 1 and 8.

Advantageous Effects of Second Embodiment

According to the contactless power transmission system of the second embodiment, it is possible to supply the load device 22 with a desired voltage thereof, substantially without depending on the load value of the power receiver apparatus 20, by controlling only the power transmitter apparatus 10 based only on the information that can be acquired by the power transmitter apparatus 10.

According to the contactless power transmission system of the second embodiment, it is possible to surely detect a foreign object through a simple configuration without a camera, a temperature sensor, or the like, and without depending on feedback from the power receiver apparatus 20 to the power transmitter apparatus 10.

According to the contactless power transmission system of the second embodiment, it is possible to stop power transmission when detecting a foreign object, thus improving the safety of the contactless power transmission system.

Other Modified Embodiments

Although the embodiments of the present disclosure have been described in detail above, the above descriptions are merely examples of the present disclosure in all respects. Needless to say, various improvements and modifications can be made without departing from the scope of the present disclosure. For example, the following changes can be made. Hereinafter, components similar to those of the above embodiments are indicated by similar reference signs, and points similar to those of the above embodiments will be omitted as appropriate.

The above-described embodiments and modifications may be combined in any manner.

The embodiments described herein are merely examples of the present disclosure in all respects. Needless to say, various improvements or modifications can be made without departing from the scope of the present disclosure. That is, in order to implement the present disclosure, a specific configuration according to the embodiments may be employed as needed.

The power transmitter apparatus may use a DC power source, instead of the AC power source. In this case, the power transmitter apparatus may be provided with a DC/DC converter, instead of the AC/DC converter.

The power transmitter apparatus may detect the power receiver apparatus using any sensor or switch other than the communication device.

FIG. 1 shows the case where the power transmitting coil L1 and the capacitor C1 are connected in series, and the power receiving coil L2 and the capacitor C2 are connected in series. However, at least one of these may be connected parallel.

The power transmitting coil, the power receiving coil, and the auxiliary coil may have a shape other than the ring shown in FIG. 2.

In order to detect the current I1 flowing through the power transmitting coil L1, for example, a shunt resistor, a current transformer, or the like may be used instead of the current detection resistor R1.

The load device may be integrated inside the power receiver apparatus as shown in FIG. 1, or may be connected externally to the power receiver apparatus.

The load device 22 may have a predetermined load value, instead of a variable load value.

SUMMARY OF EMBODIMENTS

The control apparatus for the power transmitter apparatus, the power transmitter apparatus, and the contactless power transmission system according to aspects of the present disclosure may be expressed as follows.

According to a control apparatus for a power transmitter apparatus (10) of a first aspect of the present disclosure, the control apparatus for the power transmitter apparatus (10) transmits power to a power receiver apparatus (20) provided with a power receiving coil (L2), in a contactless manner. The power transmitter apparatus (10) is provided with: a power transmitting coil (L1), an auxiliary coil (L3) electromagnetically coupled to the power transmitting coil (L1), and a power supply circuit (11, 12) that generates transmitting power having a voltage and a frequency and supplies the transmitting power to the power transmitting coil (L1). The control apparatus is provided with: a first detection circuit (13, 14), a second detection circuit (13, 14), a coupling coefficient estimator (15), and a control circuit (16). The first detection circuit (13, 14) detects a value of a current or voltage generated by the auxiliary coil (L3). The second detection circuit (13, 14) detects a value of a current flowing through the power transmitting coil (L1). The coupling coefficient estimator (15) estimates a first coupling coefficient between the power transmitting coil (L1) and the power receiving coil (L2), based on the value of the current or voltage generated by the auxiliary coil (L3), and estimates a second coupling coefficient between the power transmitting coil (L1) and the power receiving coil (L2), based on the value of the current flowing through the power transmitting coil (L1). The control circuit (16) controls the power supply circuit (11, 12) to transmit power to the power receiver apparatus (20) when a difference between the first and second coupling coefficients is equal to or less than a predetermined threshold, and stop power transmission to the power receiver apparatus (20) when the difference between the first and second coupling coefficients is greater than the threshold.

According to the control apparatus for the power transmitter apparatus (10) of a second aspect of the present disclosure, in the control apparatus for the power transmitter apparatus (10) of the first aspect of the present disclosure, the power receiver apparatus (20) is provided with a first load device (22) having a variable load value, a second load device (R2) having a predetermined load value, and a switch circuit (SW) that selectively supplies the output voltage of the power receiver apparatus (20) to one of the first load device (22) and the second load device (R2). The control apparatus is further provided with a communication device (17) communicatively connected to the power receiver apparatus (20). When transmitting power in a normal manner, the control circuit (16) transmits a signal to the power receiver apparatus (20) using the communication device (17), the signal controlling the switch circuit (SW) to supply the output voltage of the power receiver apparatus (20) to the first load device (22). When estimating the first and second coupling coefficients, the control circuit (16) transmits a signal to the power receiver apparatus (20) using the communication device (17), the signal controlling the switch circuit (SW) to supply the output voltage of the power receiver apparatus (20) to the second load device (R2), and estimates the first and second coupling coefficients based on the values detected by the first and second detectors (13, 14).

According to a power transmitter apparatus (10) of a third aspect of the present disclosure, the power transmitter apparatus (10) is provided with: a power transmitting coil (L1); an auxiliary coil (L3) electromagnetically coupled to the power transmitting coil (L1); a power supply circuit (11, 12) that generates transmitting power having a voltage and a frequency and supplies the transmitting power to the power transmitting coil (L1); and the control apparatus for the power transmitter apparatus (10) of the first or second aspect of the present disclosure.

According to the power transmitter apparatus (10) of a fourth aspect of the present disclosure, in the power transmitter apparatus (10) of the third aspect of the present disclosure, the power transmitter apparatus (10) is further provided with a capacitor (C1) connected to the power transmitting coil (L1) so as to form an LC resonant circuit.

According to the power transmitter apparatus (10) of a fifth aspect of the present disclosure, in the power transmitter apparatus (10) of the third or fourth aspect of the present disclosure, the power transmitter apparatus (10) is further provided with a magnetic core (F1) around which the power transmitting coil (L1) and the auxiliary coil (L3) are wound. The auxiliary coil (L3) is disposed so as to surround the power transmitting coil (L1).

According to a contactless power transmission system of a sixth aspect of the present disclosure, the contactless power transmission system includes: the power transmitter apparatus (10) of any one of the first to fifth aspects of the present disclosure; and a power receiver apparatus (20) provided with a power receiving coil (L2).

According to a control apparatus for a power transmitter apparatus (10) of a seventh aspect of the present disclosure, the control apparatus for a power transmitter apparatus (10) transmits power to a power receiver apparatus (20) provided with a power receiving coil (L2), in a contactless manner. The power transmitter apparatus (10) is provided with: a power transmitting coil (L1), an auxiliary coil (L3) electromagnetically coupled to the power transmitting coil (L1), and a power supply circuit (11, 12) that generates transmitting power having a variable voltage and a variable frequency and supplies the transmitting power to the power transmitting coil (L1). The control apparatus is provided with a detection circuit (13, 14) and a control circuit (16). The detection circuit (13, 14) detects at least one of a value of a current flowing through the power transmitting coil (L1), and a value of a current or voltage generated by the auxiliary coil (L3). The control circuit (16) determines a transmitting frequency based on the value detected by the detection circuit (13, 14), the transmitting frequency at least locally minimizing dependence of an output voltage of the power receiver apparatus (20) on a load value of the power receiver apparatus (20), determines a voltage for the transmitting power at which the output voltage of the power receiver apparatus (20) is equal to a predetermined target voltage when generating the transmitting power having the transmitting frequency determined, and controls the power supply circuit (11, 12) to generate the transmitting power having the transmitting frequency and voltage determined.

According to the control apparatus for the power transmitter apparatus (10) of an eighth aspect of the present disclosure, in the control apparatus for the power transmitter apparatus (10) of the seventh aspect of the present disclosure, the power receiver apparatus (20) is provided with a first load device (22) having a variable load value, a second load device (R2) having a predetermined load value, and a switch circuit (SW) that selectively supplies the output voltage of the power receiver apparatus (20) to one of the first load device (22) and the second load device (R2). The control apparatus is further provided with a communication device (17) communicatively connected to the power receiver apparatus (20). When transmitting power in a normal manner, the control circuit (16) transmits a signal to the power receiver apparatus (20) using the communication device (17), the signal controlling the switch circuit (SW) to supply the output voltage of the power receiver apparatus (20) to the first load device (22). When determining the transmitting frequency, the control circuit (16) transmits a signal to the power receiver apparatus (20) using the communication device (17), the signal controlling the switch circuit (SW) to supply the output voltage of the power receiver apparatus (20) to the second load device (R2), and determines the transmitting frequency based on the value detected by the detection circuit (13, 14).

According to the control apparatus for the power transmitter apparatus (10) of a ninth aspect of the present disclosure, in the control apparatus for the power transmitter apparatus (10) of the seventh or eighth aspect of the present disclosure, the control apparatus is further provided with a coupling coefficient estimator (15) that estimates a coupling coefficient between the power transmitting coil (L1) and the power receiving coil (L2) based on the value detected by the detection circuit (13, 14), and determines the transmitting frequency based on the coupling coefficient.

According to the control apparatus for the power transmitter apparatus (10) of a tenth aspect of the present disclosure, in the control apparatus for the power transmitter apparatus (10) of the ninth aspect of the present disclosure, the detection circuit (13, 14) is provided with a first detector (13) that detects the value of the current or voltage generated by the auxiliary coil (L3), and a second detector (14) that detects the current flowing through the power transmitting coil (L1). The coupling coefficient estimator (15) estimates a first coupling coefficient between the power transmitting coil (L1) and the power receiving coil (L2) based on the value of the current or voltage generated by the auxiliary coil (L3), and estimates a second coupling coefficient between the power transmitting coil (L1) and the power receiving coil (L2) based on the value of the current flowing through the power transmitting coil (L1). When a difference between the first and second coupling coefficients is equal to or less than a predetermined threshold, the control circuit (16) controls the power supply circuit (11, 12) to generate the transmitting power having the frequency and voltage determined.

According to the control apparatus for the power transmitter apparatus (10) of an eleventh aspect of the present disclosure, in the control apparatus for the power transmitter apparatus (10) of the tenth aspect of the present disclosure, when the difference between the first and second coupling coefficients is greater than the predetermined threshold, the control circuit (16) controls the power supply circuit (11, 12) to stop power transmission to the power receiver apparatus (20).

According to a power transmitter apparatus (10) of a twelfth aspect of the present disclosure, the power transmitter apparatus (10) is provided with: a power transmitting coil (L1); an auxiliary coil (L3) electromagnetically coupled to the power transmitting coil (L1); a power supply circuit (11, 12) that generates transmitting power having a variable voltage and a variable frequency and supplies the transmitting power to the power transmitting coil (L1); and a control apparatus for the power transmitter apparatus (10) of any one of the seventh to eleventh aspects of the present disclosure.

According to the power transmitter apparatus (10) of a thirteenth aspect of the present disclosure, in the power transmitter apparatus (10) of the twelfth aspect of the present disclosure, the power transmitter apparatus (10) is further provided with a capacitor (C1) connected to the power transmitting coil (L1) so as to form an LC resonant circuit.

According to the power transmitter apparatus (10) of a fourteenth aspect of the present disclosure, in the power transmitter apparatus (10) of the twelfth or thirteenth aspect of the present disclosure, the power transmitter apparatus (10) is further provided with a magnetic core (F1) around which the power transmitting coil (L1) and the auxiliary coil (L3) are wound. The auxiliary coil (L3) is disposed so as to surround the power transmitting coil (L1).

According to a contactless power transmission system of a fifteenth aspect of the present disclosure, the contactless power transmission system includes: the power transmitter apparatus (10) of any one of the twelfth to fourteenth aspects of the present disclosure; and a power receiver apparatus (20) provided with a power receiving coil (L2).

INDUSTRIAL APPLICABILITY

The present disclosure is applicable to a contactless power transmission system in which power is transmitted through a magnetic field, and the coupling coefficient between the power transmitting coil and the power receiving coil may vary. The present disclosure is also applicable to a contactless power transmission system in which power is transmitted through a magnetic field, and the coupling coefficient between the power transmitting coil and the power receiving coil is constant.

The invention claimed is:
1. A control apparatus for a power transmitter apparatus that transmits power to a power receiver apparatus comprising a power receiving coil, in a contactless manner,
wherein the power transmitter apparatus comprises: a power transmitting coil, an auxiliary coil electromagnetically coupled to the power transmitting coil, and a power supply circuit that generates transmitting power having a variable voltage and a variable frequency and supplies the transmitting power to the power transmitting coil,
wherein the control apparatus comprises:
a detection circuit that detects at least one value of a value of a current flowing through the power transmitting coil, and a value of a current or voltage generated by the auxiliary coil; and
a control circuit that determines a transmitting frequency based on the at least one value detected by the detection circuit, the transmitting frequency at least locally minimizing dependence of an output voltage of the power receiver apparatus on a load value of the power receiver apparatus, determines a voltage for the transmitting power at which the output voltage of the power receiver apparatus is equal to a predetermined target voltage when generating the transmitting power having the determined transmitting frequency, and controls the power supply circuit to generate the transmitting power having the determined transmitting frequency and voltage.
2. The control apparatus for the power transmitter apparatus according to claim 1, wherein the power receiver apparatus comprises a first load device having a variable load value, a second load device having a predetermined load value, and a switch circuit that selectively supplies the output voltage of the power receiver apparatus to one of the first load device and the second load device, wherein the control apparatus further comprises a communication circuit communicatively connected to the power receiver apparatus, wherein, when transmitting power in a normal manner, the control circuit transmits a signal to the power receiver apparatus using the communication circuit, the signal controlling the switch circuit to supply the output voltage of the power receiver apparatus to the first load device, and wherein, when determining the transmitting frequency, the control circuit transmits a second signal to the power receiver apparatus using the communication circuit, the second signal controlling the switch circuit to supply the output voltage of the power receiver apparatus to the second load device, and determines the transmitting frequency based on the value detected by the detection circuit.

3. The control apparatus for the power transmitter apparatus according to claim 1, further comprising a coupling coefficient estimator that estimates a coupling coefficient between the power transmitting coil and the power receiving coil based on the at least one value detected by the detection circuit, and determines the transmitting frequency based on the coupling coefficient.

4. The control apparatus for the power transmitter apparatus according to claim 3, wherein the detection circuit comprises a first detector that detects the value of the current or voltage generated by the auxiliary coil, and a second detector that detects the current flowing through the power transmitting coil, wherein the coupling coefficient estimator estimates a first coupling coefficient between the power transmitting coil and the power receiving coil based on the value of the current or voltage generated by the auxiliary coil, and estimates a second coupling coefficient between the power transmitting coil and the power receiving coil based on the value of the current flowing through the power transmitting coil, and wherein, when a difference between the first and second coupling coefficients is equal to or less than a predetermined threshold, the control circuit controls the power supply circuit to generate the transmitting power having the determined frequency and voltage.

5. The control apparatus for the power transmitter apparatus according to claim 4, wherein, when the difference between the first and second coupling coefficients is greater than the predetermined threshold, the control circuit controls the power supply circuit to stop the power transmission to the power receiver apparatus.

6. A power transmitter apparatus comprising:
a power transmitting coil;
an auxiliary coil electromagnetically coupled to the power transmitting coil;
a power supply circuit that generates transmitting power having a variable voltage and a variable frequency and supplies the transmitting power to the power transmitting coil; and a control apparatus for the power transmitter apparatus,
wherein the power transmitter apparatus transmits power to a power receiver apparatus comprising a power receiving coil, in a contactless manner,
wherein the control apparatus comprises:
a detection circuit that detects at least one value of a value of a current flowing through the power transmitting coil, and a value of a current or voltage generated by the auxiliary coil; and
a control circuit that determines a transmitting frequency based on the at least one value detected by the detection circuit, the transmitting frequency at least locally minimizing dependence of an output voltage of the power receiver apparatus on a load value of the power receiver apparatus, determines a voltage for the transmitting power at which the output voltage of the power receiver apparatus is equal to a predetermined target voltage when generating the transmitting power having the determined transmitting frequency, and controls the power supply circuit to generate the transmitting power having the determined transmitting frequency and voltage.

7. The power transmitter apparatus according to claim 6, further comprising a capacitor connected to the power transmitting coil so as to form an LC resonant circuit.

8. The power transmitter apparatus according to claim 6, further comprising a magnetic core around which the power transmitting coil and the auxiliary coil are wound,
wherein the auxiliary coil is disposed so as to surround the power transmitting coil.

9. A contactless power transmission system including:
a power transmitter apparatus; and
a power receiver apparatus comprising a power receiving coil,
wherein the power transmitter apparatus comprises:
a power transmitting coil;
an auxiliary coil electromagnetically coupled to the power transmitting coil;
a power supply circuit that generates transmitting power having a variable voltage and a variable frequency and supplies the transmitting power to the power transmitting coil; and
a control apparatus for the power transmitter apparatus,
wherein the power transmitter apparatus transmits power to the power receiver apparatus in a contactless manner,
wherein the control apparatus comprises:
a detection circuit that detects at least one value of a value of a current flowing through the power transmitting coil, and a value of a current or voltage generated by the auxiliary coil; and
a control circuit that determines a transmitting frequency based on the at least one value detected by the detection circuit, the transmitting frequency at least locally minimizing dependence of an output voltage of the power receiver apparatus on a load value of the power receiver apparatus, determines a voltage for the transmitting power at which the output voltage of the power receiver apparatus is equal to a predetermined target voltage when generating the transmitting power having the determined transmitting frequency, and controls the power supply circuit to generate the transmitting power having the determined transmitting frequency and voltage.

* * * * *